US 012499843B2

(12) United States Patent
Yanase et al.

(10) Patent No.: US 12,499,843 B2
(45) Date of Patent: Dec. 16, 2025

(54) SCANNING CIRCUIT

(71) Applicant: Xiamen Tianma Display Technology Co., Ltd., Xiamen (CN)

(72) Inventors: Jiro Yanase, Kanagawa (JP); Masamichi Shimoda, Kanagawa (JP)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/968,985

(22) Filed: Dec. 4, 2024

(65) Prior Publication Data

US 2025/0191541 A1      Jun. 12, 2025

(30) Foreign Application Priority Data

Dec. 12, 2023   (JP) .................................. 2023-209223
Sep. 4, 2024    (JP) .................................. 2024-152417

(51) Int. Cl.
  *G09G 3/3266*    (2016.01)
  *G09G 3/3233*    (2016.01)
  *G11C 19/28*     (2006.01)

(52) U.S. Cl.
  CPC ......... *G09G 3/3266* (2013.01); *G09G 3/3233* (2013.01); *G11C 19/28* (2013.01); *G09G 2300/0814* (2013.01); *G09G 2300/0852* (2013.01); *G09G 2310/0286* (2013.01); *G09G 2310/08* (2013.01); *G09G 2320/0693* (2013.01)

(58) Field of Classification Search
  CPC ............... G09G 3/3233; G09G 3/3266; G09G 2300/0814; G09G 2300/0852; G09G 2310/0286; G09G 2310/08; G09G 2320/0693; G11C 19/28
  See application file for complete search history.

(56) References Cited

U.S. PATENT DOCUMENTS

2011/0292007 A1    12/2011  Ohhashi
2012/0038609 A1*    2/2012  Chung ................. G09G 3/3266
                                                    345/211
2016/0163401 A1     6/2016  Nonaka

FOREIGN PATENT DOCUMENTS

JP        2006-24350 A  *  1/2006

* cited by examiner

*Primary Examiner* — Stacy Khoo
(74) *Attorney, Agent, or Firm* — NIXON & VANDERHYE

(57) ABSTRACT

Shift registers output high-level pulses each having a length of two or more horizontal periods one after another with a transfer step of one horizontal period. The shift register is controlled by a first clock signal and a second clock signal in m phases of clock signals. The shift register includes a high-level output thin-film transistor, a low-level output thin-film transistor and a buffer thin-film transistor. The buffer thin-film transistor receives a control signal having a pulse width and a cycle same as the first clock signal in a period where an output terminal is outputting a low-level potential. High-duties of the first clock signal and the second clock signal are expressed as PW/mH, where PW represents pulse widths of the first clock signal and the second clock signal and H represents one horizontal period. On-duties of all the thin-film transistors are not more than PW/mH.

19 Claims, 30 Drawing Sheets

Vgs=Vgh-Vgl, Vds=0, Duty=0.19%

Vgs=Vgh-Vgl, Vds=0, Duty=0.19%

TWO-PHASE CLOCK (m = 2)

THREE-PHASE CLOCK (m = 3)

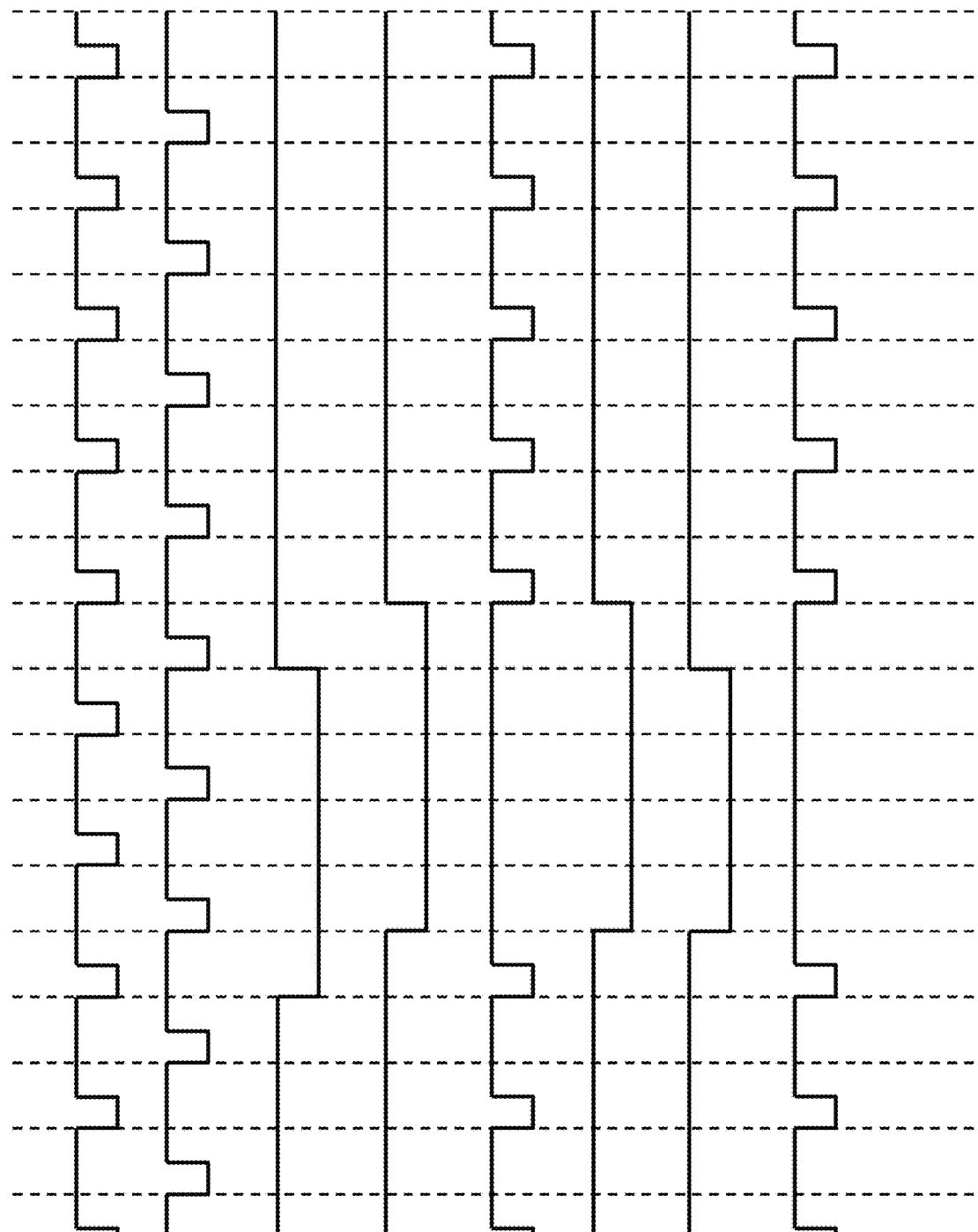

SCANNING CIRCUIT

CROSS-REFERENCE TO RELATED APPLICATIONS

This non-provisional application claims priority under 35 U.S.C. § 119(a) on Patent Application No. 2023-209223 filed in Japan on Dec. 12, 2023 and Patent Application No. 2024-152417 filed in Japan on Sep. 4, 2024, the entire contents of which are hereby incorporated by reference.

BACKGROUND

This disclosure relates to a scanning circuit.

A current-driven light-emitting element like an organic light-emitting diode (OLED) element has advantages such as no need of backlight and achievement of low power consumption, wide viewing angle, and high contrast ratio; it is expected to contribute to development of flat panel display devices.

An active-matrix (AM) OLED display device includes a plurality of switching transistors for selecting a pixel and writing a data signal to a storage capacitor and a driving transistor for supplying electric current to the pixel. The transistors in the OLED display device are thin-film transistors (TFTs); they can be low-temperature polysilicon (LTPS) TFTs, oxide semiconductor TFTs, and/or amorphous silicon TFTs.

In order to write more appropriate data signals to pixels, it is important to compensate for differences and shifts in threshold voltage of the TFTs. Providing each pixel circuit with a longer control period (also referred to as threshold compensation period) for calibrating the threshold voltage enables writing a more appropriate data signal to a storage capacitor.

SUMMARY

An aspect of this disclosure is a scanning circuit configured to output gate signals to pixel circuits of a display panel, the scanning circuit including: a plurality of shift registers connected in series, wherein the scanning circuit is configured to be controlled by m phases of clock signals, where m is an integer greater than one, wherein the plurality of shift registers are configured to output high-level pulses each having a length of two or more horizontal periods one after another with a transfer step of one horizontal period, wherein each of the plurality of shift registers is configured to be controlled by two-phase clock signals consisting of a first clock signal and a second clock signal in the m phases of clock signals, wherein all thin-film transistors in each of the plurality of shift registers have the same conductive type, wherein each of the plurality of shift registers includes: a high-level output thin-film transistor including a source connected to an output terminal of the shift register and a drain connected to a high-power line; a low-level output thin-film transistor including a drain connected to the output terminal of the shift register and a source connected to a low-power line; and a buffer thin-film transistor including a source/drain terminal to receive the first clock signal and another source/drain terminal connected to a gate of the low-level output thin-film transistor, wherein the buffer thin-film transistor is configured to receive a control signal having a pulse width and a cycle same as the first clock signal at a gate of the buffer thin-film transistor in a period where the output terminal is outputting a low-level potential, wherein high-duties of the first clock signal and the second clock signal are expressed as PW/mH, where PW represents pulse widths of the first clock signal and the second clock signal and H represents one horizontal period, and wherein on-duties of all the thin-film transistors are not more than PW/mH.

An aspect of this disclosure is a scanning circuit configured to output gate signals to pixel circuits of a display panel, the scanning circuit including: a plurality of shift registers connected in series, wherein the scanning circuit is configured to be controlled by m phases of clock signals, where m is an integer greater than one, wherein the plurality of shift registers are configured to output low-level pulses each having a length of two or more horizontal periods one after another with a transfer step of one horizontal period, wherein each of the plurality of shift registers is configured to be controlled by two-phase clock signals consisting of a first clock signal and a second clock signal in the m phases of clock signals, wherein all thin-film transistors in each of the plurality of shift registers have the same conductive type, wherein each of the plurality of shift registers includes: a high-level output thin-film transistor including a drain connected to an output terminal of the shift register and a source connected to a high-power line; a low-level output thin-film transistor including a source connected to the output terminal of the shift register and a drain connected to a low-power line; and a buffer thin-film transistor including a source/drain terminal to receive the first clock signal and another source/drain terminal connected to a gate of the low-level output thin-film transistor, wherein the buffer thin-film transistor is configured to receive a control signal having a pulse width and a cycle same as the first clock signal at a gate of the buffer thin-film transistor in a period where the output terminal is outputting a low-level potential, wherein low-duties of the first clock signal and the second clock signal are expressed as PW/mH, where PW represents pulse widths of the first clock signal and the second clock signal and H represents one horizontal period, and wherein on-duties of all the thin-film transistors are not more than PW/mH.

It is to be understood that both the foregoing general description and the following detailed description are exemplary and explanatory and are not restrictive of this disclosure.

BRIEF DESCRIPTION OF THE DRAWINGS

FIG. 19 illustrates temporal variation of some signals of the shift register in FIG. 18.

EMBODIMENTS

Figure 1:
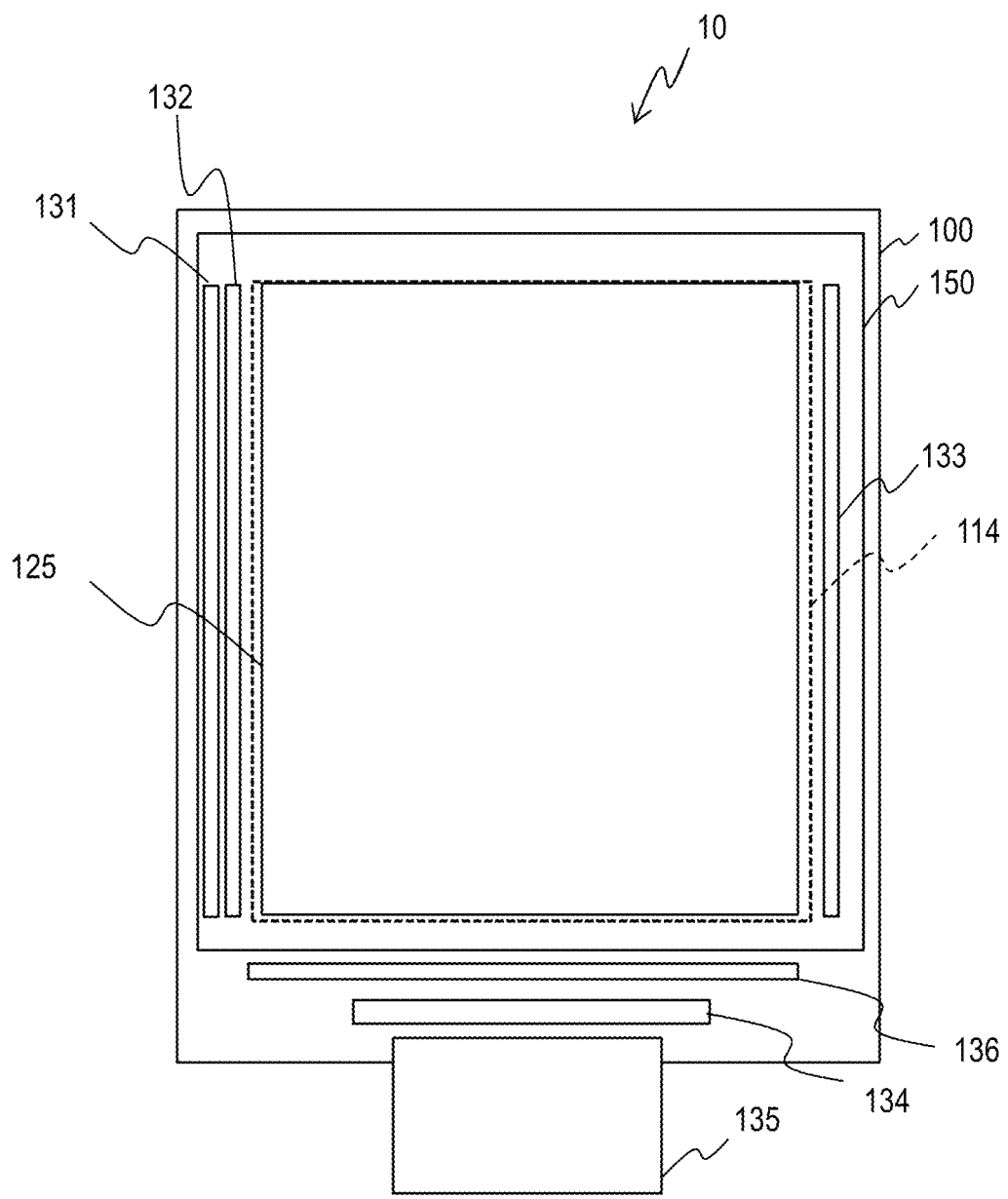
FIG. 1 schematically illustrates a configuration example of an OLED display device of a display device.

Hereinafter, embodiments will be described specifically with reference to the drawings. Elements common to the drawings are denoted by the same reference signs and some elements in the drawings are exaggerated in size or shape for clear understanding of the description.

Disclosed in the following is a technique for improving a scanning circuit in an electro-luminescent display device. The electro-luminescent display device is a display device utilizing light-emitting elements that emit light in response to driving current, like an organic light-emitting diode (OLED) display device or an inorganic LED display device. The type of the display device to which the technique of this disclosure is applicable is not limited and also, the technique is applicable to devices other than display devices.

A display device related to an embodiment of this specification has a long control period of a pixel circuit (also referred to as threshold compensation period) for calibrating the threshold voltage of a thin-film transistor (TFT) in order to write a more appropriate data signal a storage capacitor. The display device includes a plurality of scanning circuits that output different control signals.

At least one of the scanning circuits outputs a control signal having a pulse width longer than one horizontal period (1H period) in order to provide a pixel circuit with a long threshold compensation period in comparison to a data write period for writing a data signal to a storage capacitor. The pulse width of this control signal is the period where the signal level keeps the control target TFT to be ON. In the case where the control target is an n-type TFT, the signal is at an H-level during the period. The signal to make the control target TFT ON is also referred to as active signal.

One horizontal period is calculated from a frame rate and the number of pixel circuit rows. Specifically, one horizontal period=1/frame rate/the number of rows. For example, in the case where the frame rate is 120 Hz and the number of rows is 2952, 1H period is 2.82 μs.

The scanning circuit transfers a pulse having a width of an integral multiple of 1H period to the next stage after 1H period. That is to say, each output line of the scanning circuit starts outputting a pulse 1H period after the output line of the previous stage outputs a pulse. As noted from this description, the transfer step of a pulse is 1H period and a plurality of consecutive output lines are active together in the same period. This way of scanning can be referred to as overlap scanning.

The emission duty of a display device is usually high, as high as 99% or more; accordingly, each output line is non-active almost all the time. In other words, to keep same signal level for a long time, each output circuit in the scanning circuit can include a TFT to be ON almost all the time. When a TFT is kept ON for a long time, its characteristics could deteriorate. The degree of the deterioration is large especially in the case of an oxide TFT or an amorphous silicon TFT. Although the foregoing description is provided for an n-type TFT circuit by way of example, the conductive type is not limited to the n-type.

An embodiment of this specification proposes a circuit configuration of a scanning circuit that suppresses deterioration of TFTs. FIG. 1 schematically illustrates a configuration example of an OLED display device 10 of a display device. The horizontal direction in FIG. 1 is an X-axis direction and the vertical direction is a Y-axis direction, which is perpendicular to the X-axis direction. The features of this disclosure are applicable to display devices including other types of light-emitting elements like inorganic LEDs. The OLED display device 10 includes a TFT substrate 100 on which OLED elements (light-emitting elements) are fabricated and an encapsulation substrate 150 for encapsulating the OLED elements.

The space between the TFT substrate 100 and the encapsulation substrate 150 is filled with an inactive gas such as dry nitrogen and sealed up. In place of the encapsulation substrate 150, a structural encapsulation unit having a different structure, such as a structural encapsulation unit utilizing thin-film encapsulation, can be employed.

In the periphery of a cathode electrode region 114 located outer than the display region 125 of the TFT substrate 100, scanning circuits (also referred to as gate driver circuits) 131, 132, and 133, a driver IC 134, and a demultiplexer 136 are provided. The driver IC 134 is connected to the external devices via flexible printed circuits (FPC) 135. The scanning circuits 131, 132, and 133 drive scanning lines on the TFT substrate 100.

The driver IC 134 is mounted with an anisotropic conductive film (ACF), for example. The driver IC 134 provides power and timing signals (control signals) to the scanning circuits 131, 132, and 133 and further, provides a data signal to the demultiplexer 136.

The demultiplexer 136 outputs output of one pin of the driver IC 134 to d data lines one after another (d is an integer greater than 1). The demultiplexer 136 changes the data line where to output the data signal from the driver IC 134 d times per scanning period to drive d times as many data lines as output pins of the driver IC 134.

The display region 125 includes a plurality of OLED elements (pixels) and a plurality of pixel circuits for controlling light emission of the plurality of pixels. In an example of a full-color OLED display device, each OLED element emits light in one of the colors of red, blue, and green. The plurality of pixel circuits constitute a pixel circuit array.

As will be described later, each pixel circuit includes a driving TFT (driving transistor) and a storage capacitor for storing a signal voltage that determines the driving current of the driving TFT. The data signal transmitted by a data line is adjusted with the threshold voltage Vth of the driving TFT and stored to the storage capacitor. The voltage of the storage capacitor determines the gate voltage (Vgs) of the driving TFT. The adjusted control voltage of the storage capacitor changes the conductance of the driving TFT in an analog manner to supply a forward bias current corresponding to the emission level to the OLED element.

Configuration of Pixel Circuit

Figure 2:
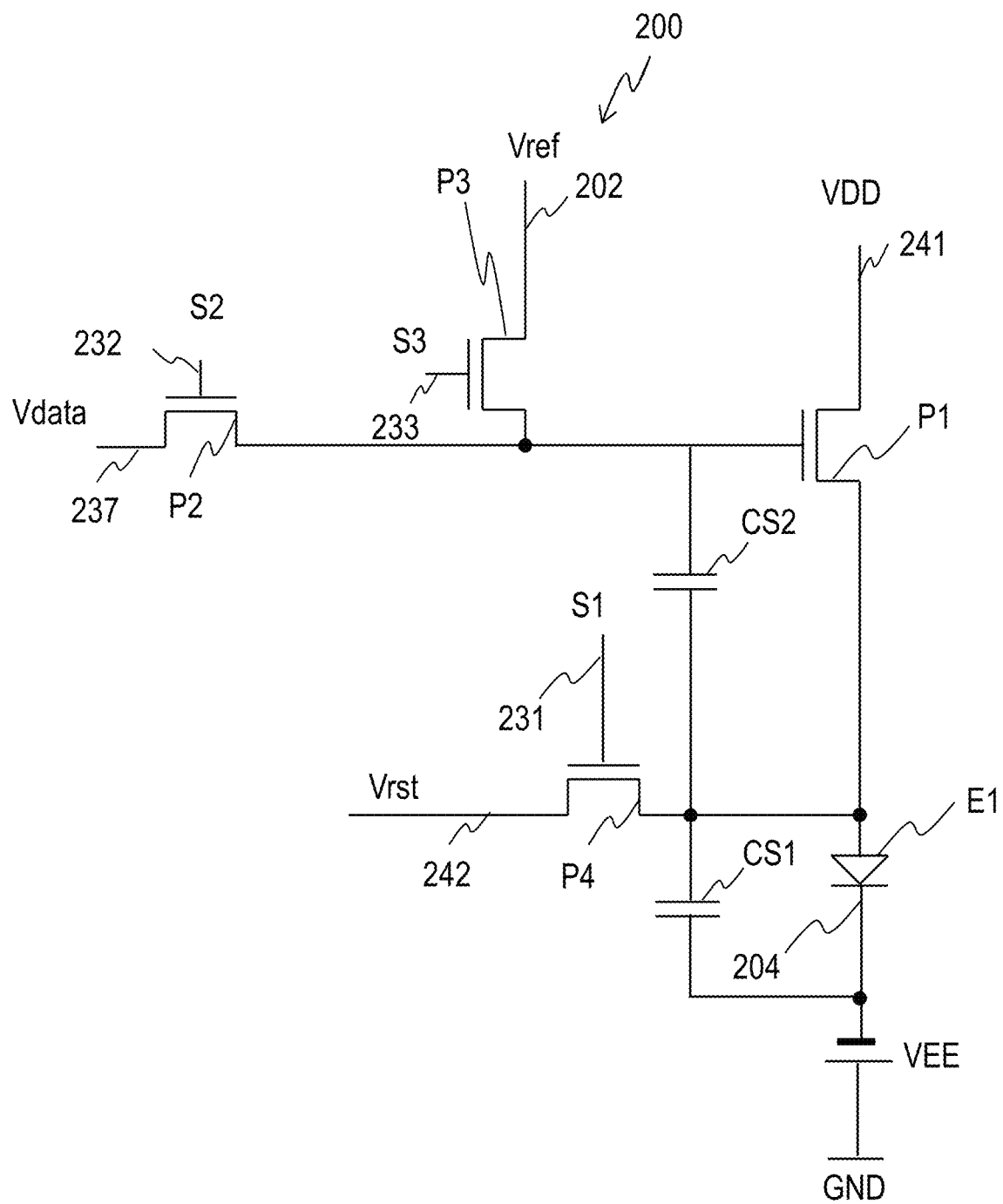
FIG. 2 illustrates a configuration example of a pixel circuit and control signals therefor that is related to an embodiment of this specification.

FIG. 2 illustrates a configuration example of a pixel circuit 200 and control signals therefor that is related to an embodiment of this specification. The pixel circuit in FIG. 2 is merely an example; the configuration of the pixel circuit to be controlled by the scanning circuit of this disclosure is not limited to this. The pixel circuit 200 is included in the k-th pixel circuit row (k is an integer). The pixel circuit 200 includes four transistors (TFTs) P1 to P4 each having a gate, a source, and a drain. All the transistors P1 to P4 in this example have n-type conductivity and they can be oxide semiconductor transistors.

The transistor P1 is a driving transistor for controlling the amount of current for the OLED element E1. The drain of the driving transistor P1 is connected to a power line 241 for transmitting a positive power-supply potential VDD. The driving transistor P1 controls the amount of electric current to be supplied from the power line 241 to the OLED element E1 in accordance with the voltage stored in storage capacitive elements CS1 and CS2 that are connected in series. The storage capacitive elements CS1 and CS2 hold the written voltage throughout the period of one frame. The cathode of the OLED element E1 is connected to a power line 204 for transmitting a negative power-supply potential VEE from a cathode power supply.

The capacitive elements CS1 and CS2 are connected in series between the power line 204 for transmitting the negative power-supply potential VEE and the gate of the driving transistor P1. An end of the capacitive element CS1 is connected to the power line 204 and the other end of the capacitive element CS1 is connected to an end of the capacitive element CS2. The other end of the capacitive element CS2 is connected to the gate of the driving transistor P1. The source of the transistor P1 and the anode of the OLED element E1 are connected to an intermediate node between the capacitive elements CS1 and CS2.

The composite capacitor of the series storage capacitive elements CS1 and CS2 stores the voltage between the gate of the driving transistor P1 and the power line 204. The source of the driving transistor P1 is connected to the OLED element E1. The storage capacitive elements CS1 and CS2 store the gate-source voltage of the driving transistor P1.

The transistor P4 works to supply a reset potential Vrst to the anode of the OLED element E1 and the intermediate node between the storage capacitive elements CS1 and CS2. One end of the source/drain (the source or the drain) of the transistor P4 is connected to a power line 242 for transmitting the reset potential Vrst and the other end is connected to the anode of the OLED element E1 and the intermediate node between the capacitive elements CS1 and CS2. The reset potential Vrst can be equal to the negative power-supply potential VEE.

The gate of the transistor P4 is connected to a control signal line 231 for transmitting a selection signal S1 and the transistor P4 is controlled by the selection signal S1. When the transistor P4 is turned ON by the selection signal S1 from the scanning circuit 131, the transistor P4 supplies the reset potential Vrst transmitted by the power line 242 to the anode of the OLED element E1 and the intermediate node between the capacitive elements CS1 and CS2.

The transistor P3 controls whether to supply a reference potential Vref to the gate of the transistor P1. The reference potential Vref can be a constant negative potential like the reset potential Vrst but higher than the reset potential. One end of the source/drain of the transistor P3 is connected to a power line 202 for transmitting the reference potential Vref and the other end is connected to the gate of the transistor P1. The gate of the transistor P3 is connected to a control signal line 233 for transmitting a selection signal S3 and the transistor P3 is controlled by the selection signal S3 input from the scanning circuit 133 to its gate.

The transistor P2 is a switching transistor for selecting the pixel circuit to be supplied with a data signal and writing the data signal (data signal voltage) Vdata to the storage capacitive elements CS1 and CS2. An end of the source/drain of the transistor P2 is connected to the storage capacitive element CS2 and the gate of the transistor P1 and the other end is connected to a data line 237 for transmitting the data signal Vdata.

The gate of the transistor P2 is connected to a control signal line 232 for transmitting a selection signal S2 from the scanning circuit 132. The transistor P2 is controlled by the selection signal S2. In the pixel circuit 200, the selection signal S2 is a selection signal for controlling whether to supply the data signal Vdata to the storage capacitive elements CS1 and CS2. When the transistor P2 is ON, the transistor P2 supplies the data signal Vdata supplied from the driver IC 134 through the data line 237 to the storage capacitive elements CS1 and CS2.

Operation of Pixel Circuit

Figure 3:
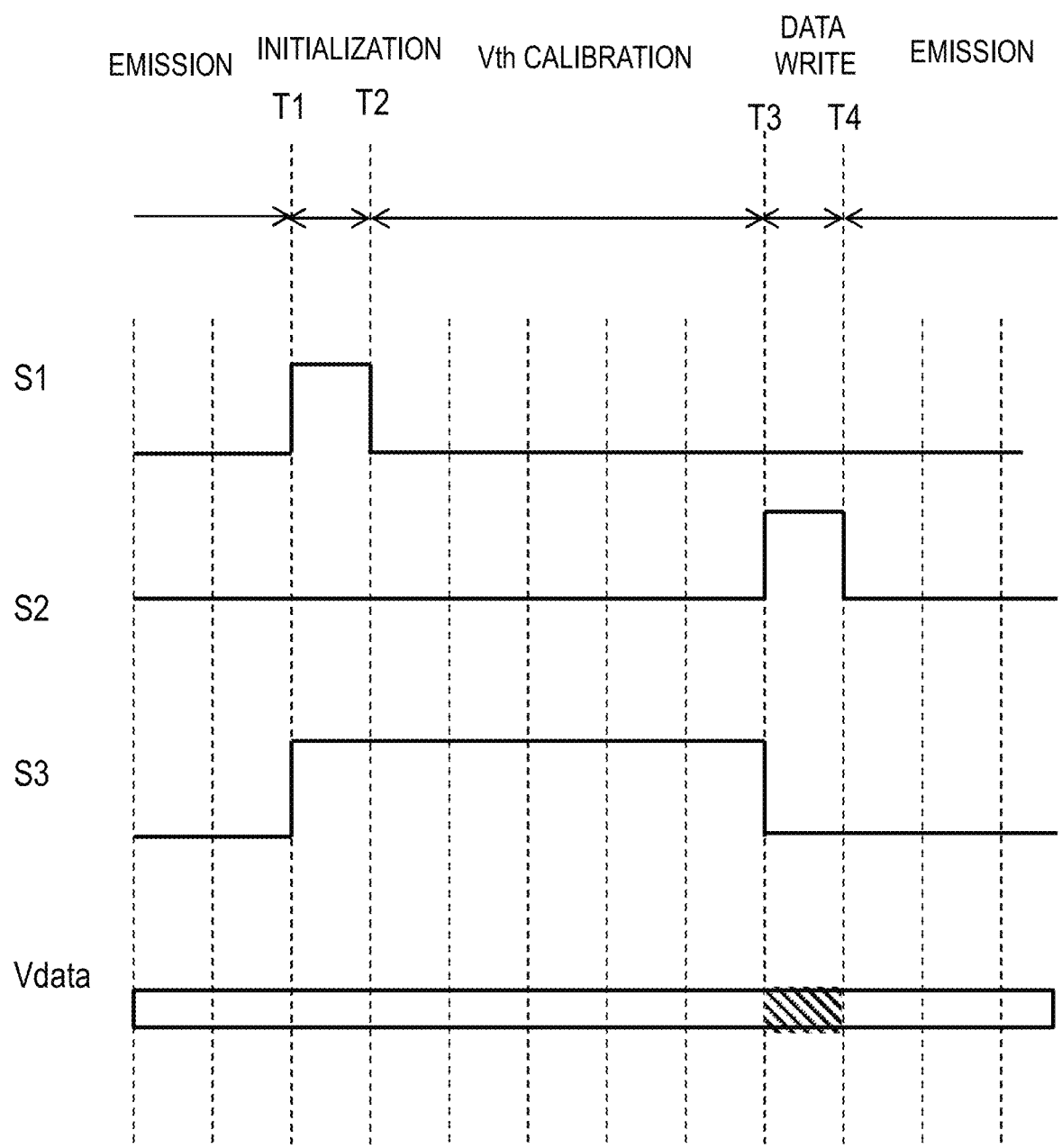
FIG. 3 is a timing chart of signals for controlling the pixel circuit in FIG. 2 in one frame period.

FIG. 3 is a timing chart of the signals for controlling the pixel circuit 200 in FIG. 2 in one frame period. FIG. 3 is a timing chart for selecting the k-th row and writing a data signal to the pixel circuit 200 therein. Specifically, FIG. 3 is a timing chart of the selection signals S1, S2, and S3 and the data signal Vdata.

The period before a time T1 is an emission period. The selection signals S1, S2, and S3 are Low. During this period, the transistors P2 to P4 are OFF. Because of the voltage stored in the composite capacitor of the series storage capacitive elements CS1 and CS2, driving current is supplied from the power line 241 to the OLED element E1 through the driving transistor P1, so that the OLED element E1 emits light.

The period from the time T1 to a time T2 is an initialization period. At the time T1, the selection signals S1 and S3 change from Low to High. The selection signal S2 remains Low. At the time T1, the transistors P3 and P4 turn ON and the transistor P2 remains OFF. This state is maintained from the time T1 until the time T2. This period is an initialization period and has a length of one horizontal period (1H). The reference potential Vref and the reset potential Vrst are supplied to the pixel circuit.

At the time T2, the selection signal S1 changes from High to Low. The selection signal S2 remains Low and the selection signal S3 remains High. In response to the change of the selection signal S1, the transistor P4 turns OFF. This state is maintained from the time T2 until a time T3. The period from the time T2 until the time T3 is a period for calibrating the threshold voltage Vth of the driving transistor P1. In the example in FIG. 3, the compensation period has a length of 5H.

At the time T3, the selection signal S1 remains Low; the selection signal S2 changes from Low to High; and the selection signal S3 changes from High to Low.

Since the selection signal S1 remains Low, the transistor P4 remains OFF. In response to the change of the selection signal S2, the transistor P2 turns ON. In response to the change of the selection signal S3, the transistor P3 turns OFF. The period from the time T3 until a time T4 is a data write period for writing a data signal to the storage capacitive elements CS1 and CS2. This period has a length of 1H. The period after the time T4 is an emission period. The driving transistor P1 supplies driving current in accordance with the voltage stored in the storage capacitor to the OLED element E1. This state continues to the time T1 of the next frame.

In the example in FIG. 3, the initialization period has a length of 1H and the Vth compensation period has a length of an integral multiple of 1H, specifically five times of 1H. For example, the initialization period can be determined to have a length of 1H to 3H and the Vth compensation period to have a length of 3H to 40H, where 1H can be approximately 3 µs.

Figure 4:
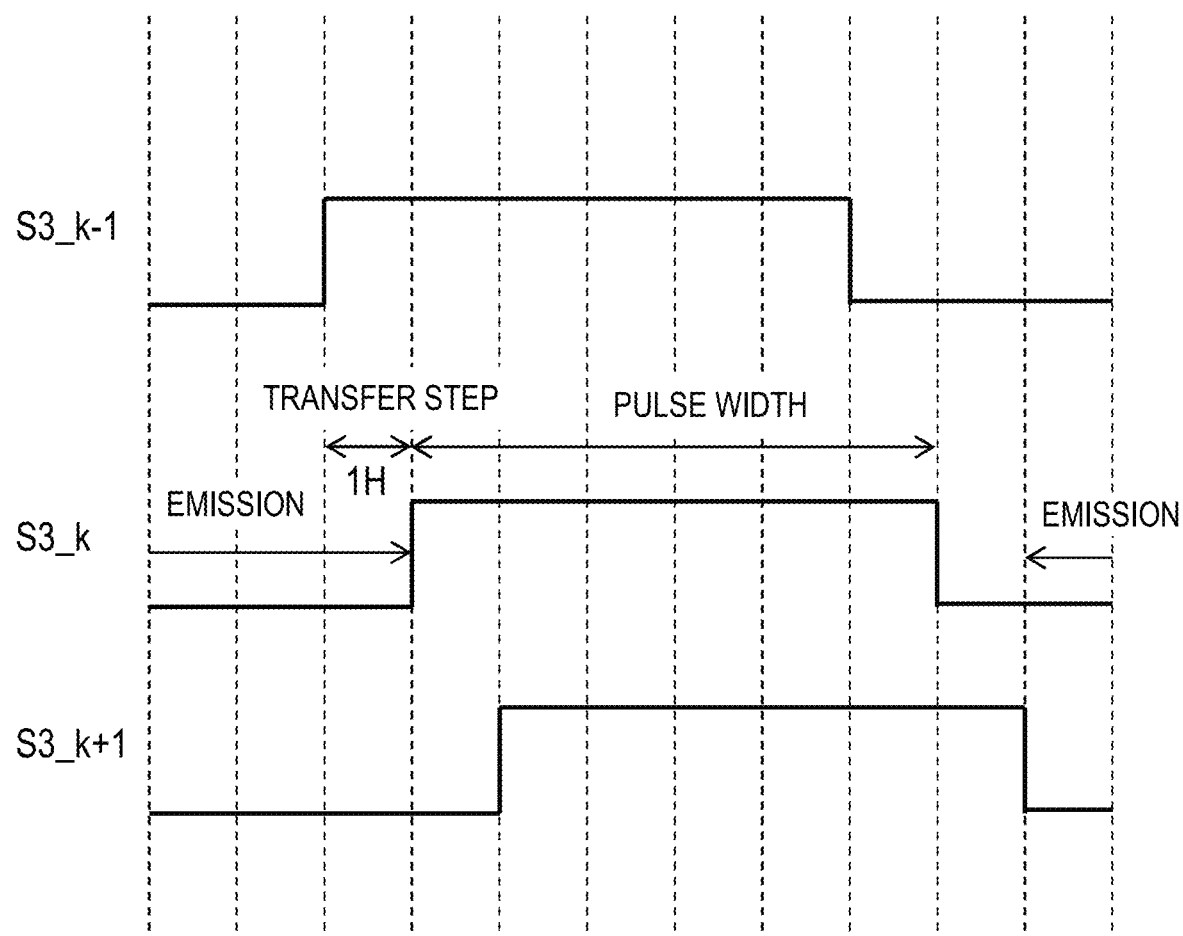
FIG. 4 illustrates temporal variation of selection signals for the (k−1)th row, the k-th row, and the (k+1)th row.

FIG. 4 illustrates temporal variation of the selection signals S3 for some consecutive pixel rows. The selection signals S3 are output from the scanning circuit 133 to individual pixel rows one after another. FIG. 4 illustrates temporal variation of the selection signals S3_k−1 for the (k−1)th row, S3_k for the k-th row, and S3_k+1 for the (k+1)th row. The selection signals S3 for two consecutive rows are shifted by 1H period. The pulse width of each selection signal S3 is the same as the one in the example in FIG. 3.

The scanning circuit 133 successively outputs selection signals S3 having a pulse width longer than one horizontal period. The scanning circuit 133 transfers a pulse having a length of an integral multiple of 1H period, 6H periods in this example, to the next stage after 1H period. That is to say, each output line of the scanning circuit 133 starts outputting a pulse 1H period after the output line of its previous stage starts outputting a pulse. The transfer step of a pulse is 1H period and a plurality of consecutive output lines are made active in the same period. As understood from this description, the scanning circuit 133 performs overlap scanning.

Figure 5:
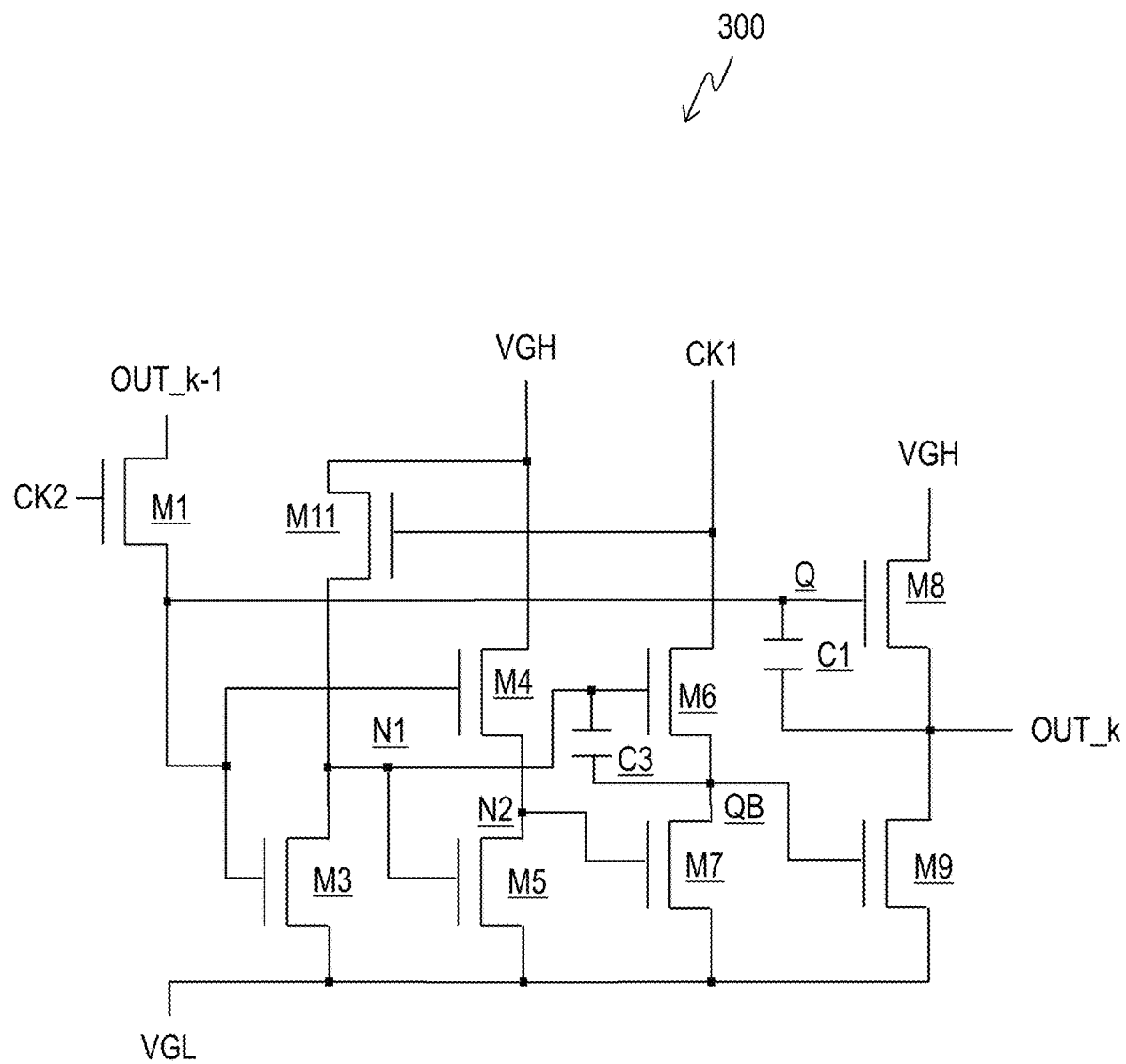
FIG. 5 illustrates a configuration example of a shift register as a part of a scanning circuit included in a scanning circuit.

FIG. 5 illustrates a configuration example of a shift register 300 as a part of the scanning circuit 133. The shift register 300 generates a signal to be output from one output terminal of the scanning circuit and outputs the signal. The scanning circuit includes a plurality of shift registers 300 connected in series. The illustrated in FIG. 5 is the k-th shift register.

In the configuration example of FIG. 5, the shift register 300 receives an output OUT_k−1 from the previous shift register, a first clock signal CK1, a second clock signal CK2, a high power-supply potential VGH, and a low power-supply potential VGL. The shift register 300 includes nine transistors and two capacitive elements. The transistors are thin-film transistors and they have n-type conductivity. The transistors can be oxide semiconductor TFTs. The conductive type can be the p-type. The shift register 300 can be fabricated on the insulating substrate of the TFT substrate 100, like the pixel circuits 200.

The shift register 300 includes transistors M1, M3 to M9, and M11, and capacitive elements C1 and C3. The capacitive elements are optional. The gate of the transistor M1 (first thin-film transistor) is connected to the transmission line for the clock signal CK2 and receives the clock signal CK2. One end of the source/drain is connected to the output line of the previous shift register and receives the output signal OUT_k−1 from the previous shift register. The other end of the source/drain is connected to the gates of the transistor M3 (third thin-film transistor) and the transistor M4 (fourth thin-film transistor) and further, to the gate of the transistor M8 (high-level output thin-film transistor) via a node Q.

The gate of the transistor M11 is connected to the transmission line for the clock signal CK1, the drain is connected to the power line for the high power-supply potential VGH, and the source is connected to a node N1. The source of the transistor M3 is connected to the power line for the low power-supply potential VGL and the drain is connected to the node N1.

The drain of the transistor M4 is connected to the power line for the high power-supply potential VGH and the source is connected to a node N2. The source of the transistor M5 (fifth thin-film transistor) is connected to the power line for the low power-supply potential VGL and the drain is connected to the node N2.

The gate of the transistor M6 (first buffer thin-film transistor) is connected to the node N1, the drain is connected to the transmission line for the clock signal CK1, and the source is connected to a node QB. The source of the transistor M7 (second buffer thin-film transistor) is connected to the power line for the low power-supply potential VGL and the drain is connected to the node QB.

The gate of the transistor M8 is connected to one end of the source/drain of the transistor M1 via the node Q. The drain is connected to the power line for the high power-supply potential VGH and the source is connected to the output terminal (output line) for the output signal OUT_k of the shift register 300. The gate of the transistor M9 (low-level output thin-film transistor) is connected to the source of the transistor M6 and the drain of the transistor M7 via the node QB. The source is connected to the power line for the low power-supply potential VGL and the drain is connected to the output terminal (output line) for the output signal OUT_k of the shift register 300.

The capacitive element C1 is connected to the output terminal (output line) for the output signal OUT_k of the shift register 300 and the node Q. In other words, the capacitive element C1 is connected to the source and the gate of the transistor M8. The capacitive element C3 is connected to the node QB and the node N1. In other words, the capacitive element C3 is connected to the source and the gate of the transistor M6.

The transistors M8 and M9 are output transistors for outputting a High-level signal and a Low-level signal, respectively. The transistors M6 and M7 are buffer transistors of the transistor M9. One end of the source/drain (the source or the drain) of a buffer transistor is connected to the gate of the output transistor. The gate of the buffer transistor receives a signal the shift register 300 has generated in accordance with the signals received from the external. The gates of the transistors M6 and M7 receive a non-cyclic signal, which is different from a cyclic signal like a clock signal, within one frame period.

The output transistors M8 and M9 have larger gate widths (sizes) than the buffer transistors M6 and M7. The buffer transistors M6 and M7 have larger gate widths than the transistors M3 to M5 and M11.

Figure 6:
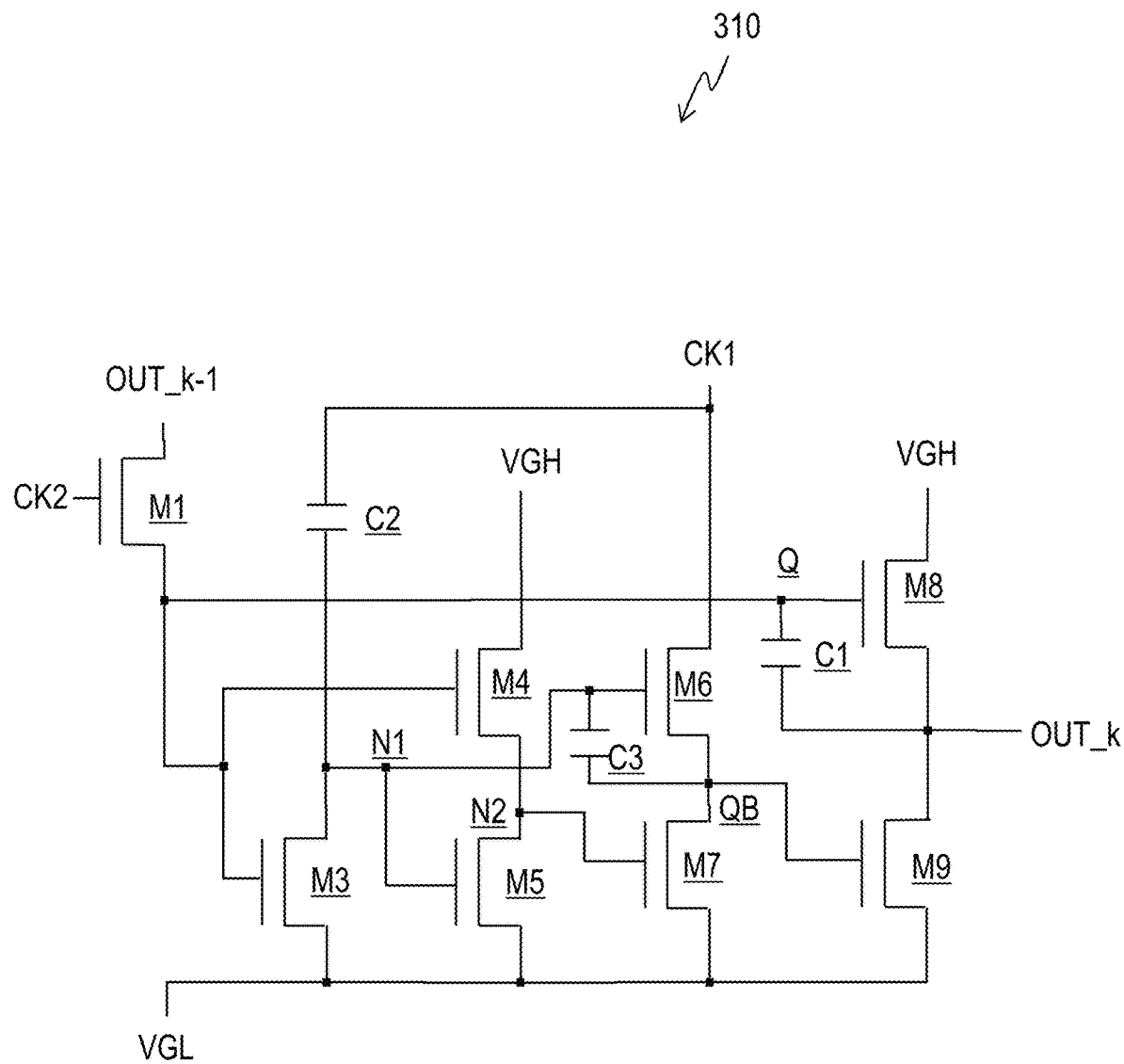
FIG. 6 illustrates another configuration example of a shift register.

FIG. 6 illustrates another configuration example 310 of a shift register. Compared to the configuration of the shift register 300 illustrated in FIG. 5, the shift register 310 does not include a transistor M11 but includes another capacitive element C2. The capacitive element C2 is connected to the transmission line for the clock signal CK1 and the node N1 and contributes to reduction in through-current that flows through the transistor M11 and M3 in FIG. 5. The through-current will be described later.

Figure 7:
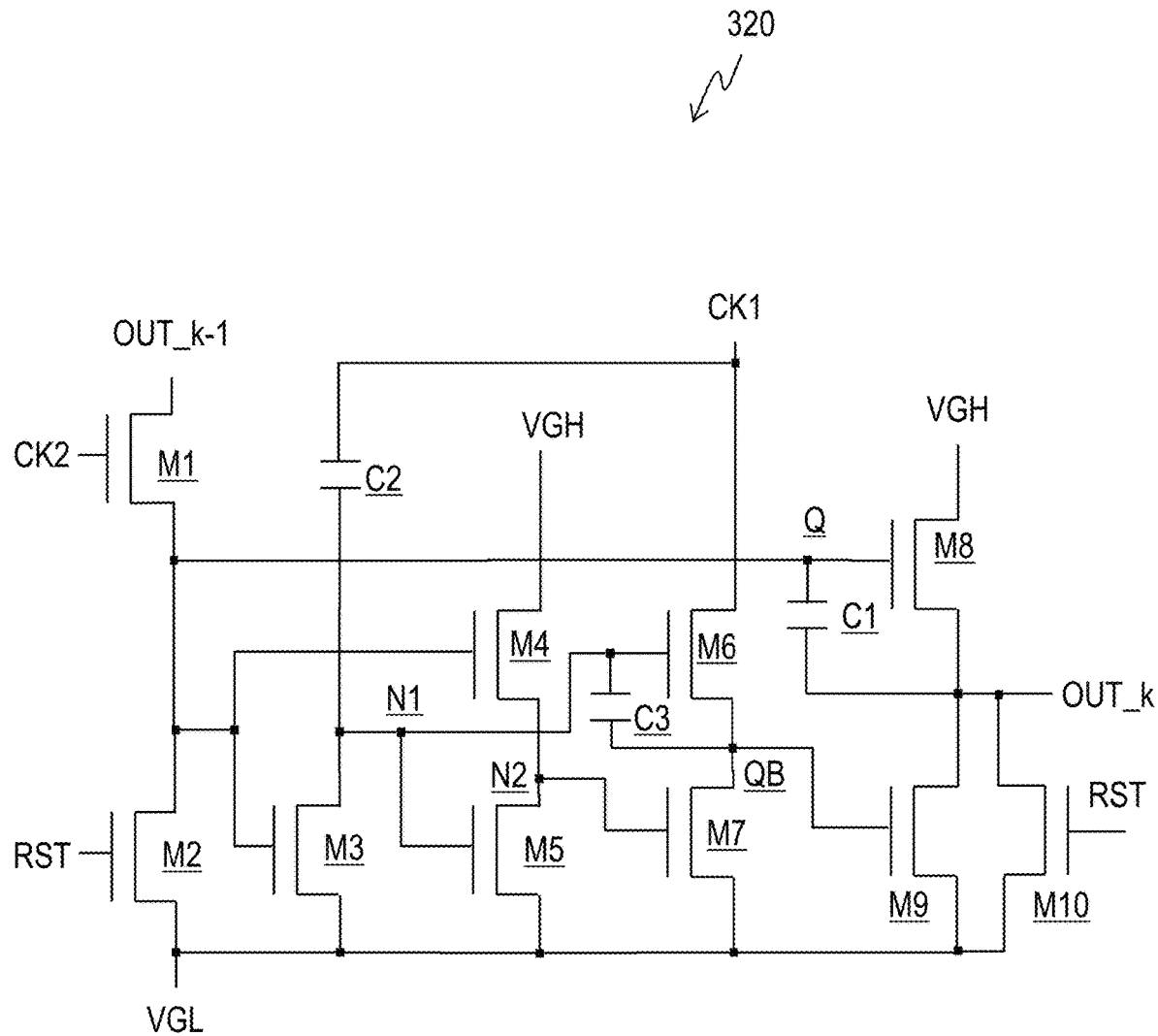
FIG. 7 illustrates still another configuration example of a shift register.

FIG. 7 illustrates still another configuration example 320 of a shift register. Compared to the shift register 310 illustrated in FIG. 6, the shift register 320 includes an additional transistor M2 (second thin-film transistor) and another additional transistor M10 (tenth thin-film transistor). Either the transistor M2 or M10 can be omitted. The gate of the transistor M2 is connected to the transmission line for a reset signal RST and receives the reset signal RST. The source of the transistor M2 is connected to the power line for the low power-supply potential VGL. The drain of the transistor M2 is connected to the gates of the transistors M3 and M4. The transistor M2 is ON for a predetermined period in each frame period to reset the potential at the node Q.

The gate of the transistor M10 is connected to the transmission line for the reset signal RST and receives the reset signal RST. The source of the transistor M10 is connected to the power line for the low power-supply potential VGL. The drain of the transistor M10 is connected to the output terminal of the output signal OUT_k. The transistor M10 is ON for a predetermined period in each frame period to reset the potential at the output terminal.

Figure 8:
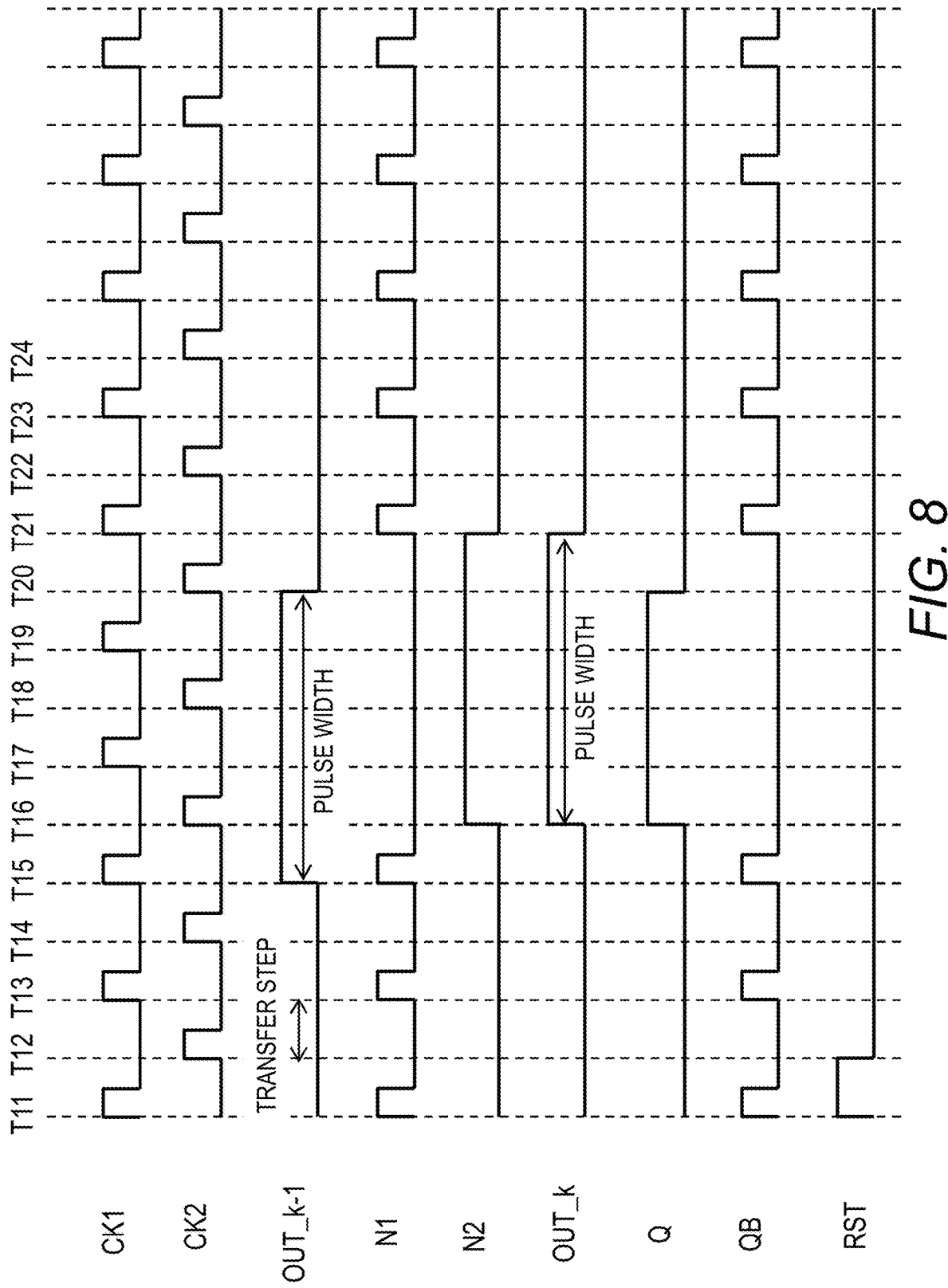
FIG. 8 illustrates temporal variation of signals input to a shift register, potentials at some nodes in the circuit thereof, and an output signal therefrom.

FIG. 8 illustrates temporal variation of the signals input to the shift register 300, 310, or 320, the potentials at some nodes in the circuit thereof, and the output signal therefrom, specifically, the clock signals CK1 and CK2, the output signal OUT_k-1 from the previous stage, the potentials at the nodes N1 and N2, the output signal OUT_k, the potentials at the nodes Q and QB, and the reset signal. Each interval between vertically extending broken lines corresponds to 1H period (a transfer step).

Hereinafter, operation of a shift register will be described, using the shift register 320 as an example. As stated above, the temporal variation of the signals in FIG. 8 is applicable to the other shift registers 300 and 310. The potentials at high levels and the low levels of the clock signals CK1 and CK2 are substantially equal to the power-supply potentials VGH and VGL, respectively, and therefore, the power-supply potentials VGH and VGL are used in the following description. Although the potentials of the nodes in the shift register 320 can take slightly different values from VGH or VGL, it is assumed that their potentials be either VGL or VGH for simplicity of explanation.

Figure 9A:
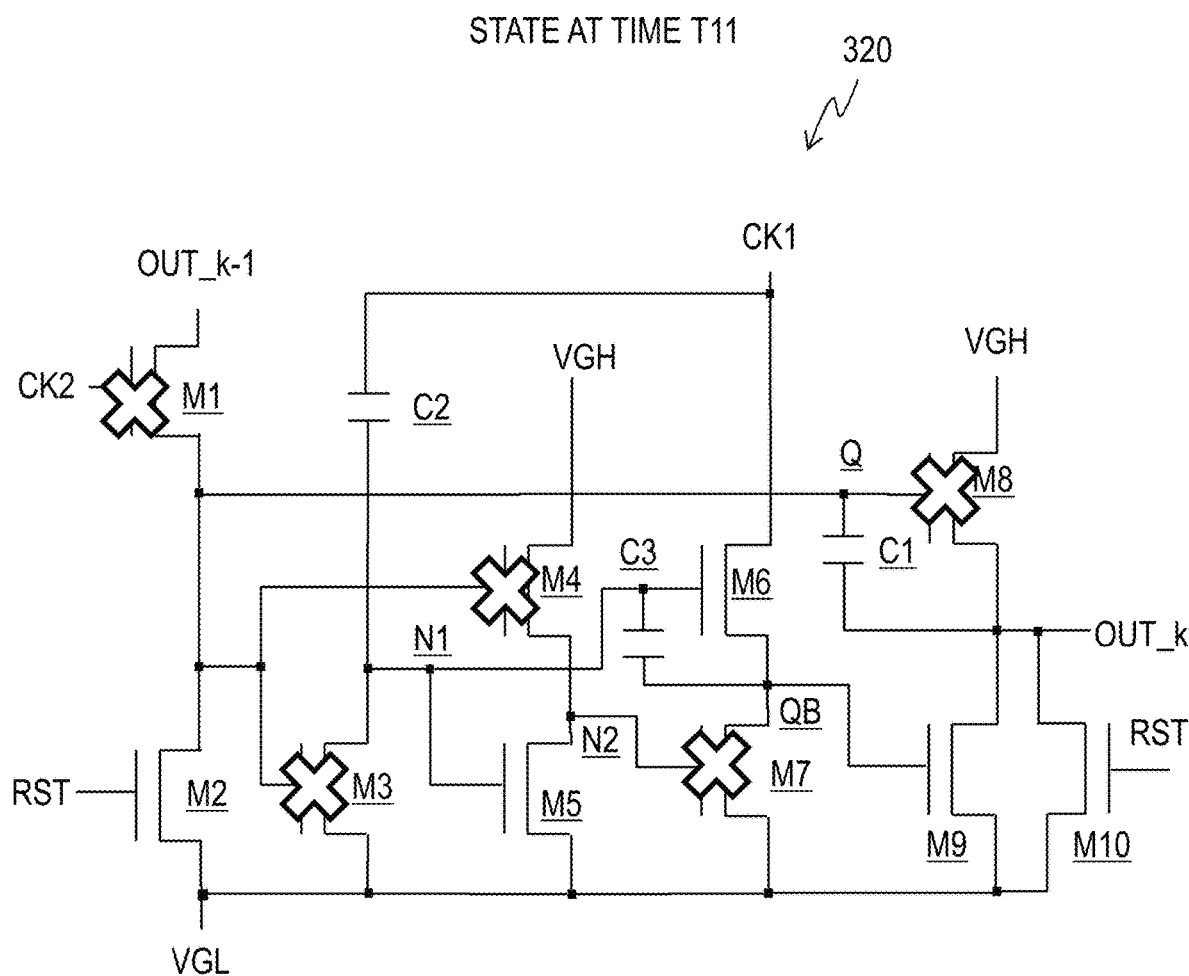
FIG. 9A illustrates one state of a shift register.

The operation of the shift register 320 in the period from the time T11 until the time T12 is described with reference to FIGS. 8 and 9A. The period from the time T11 until the time T12 is a reset period for the node Q and the output OUT_k. FIG. 9A illustrates the ON/OFF states of the transistors in the shift register 320 at the time T11. In the following description, a pulse of each signal represents the length of a period where the signal is at a high level (VGH) for making the target transistor ON.

With reference to FIG. 8, the clock signal CK1 changes from VGL to VGH at the time T11. The pulse width (the length of a high-level period) of the clock signal CK1 is shorter than 1H period and the clock signal CK1 changes from VGH to VGL before the time T12. The clock signal CK2 keeps VGL from the time T11 until the time T12. The clock signal CK2 changes from VGL to VGH at the time T12.

The clock signals CK1 and CK2 have the same pulse width and the same cycle. The pulse widths of the clock signals CK1 and CK2 are shorter than 1H period; for example, they are 1H/2 period. The cycles of the clock signals CK1 and CK2 are 2H.

The input OUT_k-1 from the previous shift register to this shift register keeps VGL from the time T11 until the time T12. The reset signal RST changes from VGL to VGH at the time T11, keeps VGH from the time T11 until the time T12, and changes from VGH to VGL at the time T12.

With reference to FIG. 9A, the transistor M1 is OFF since the clock signal CK2 is at VGL. The transistors M2 and M10 are ON since the reset signal RST is at VGH. The transistors M3, M4, and M8 are OFF since VGL is applied to their gates via the transistor M2. Likewise, the potential at the node Q is VGL as illustrated in FIG. 8.

Since the clock signal CK1 changes from VGL to VGH as illustrated in FIG. 8, the potential at the node N1 changes from VGL to VGH because of the capacitive coupling of the capacitive element C2. Accordingly, the transistor M5 is ON. Since the transistor M5 is ON, the potential at the node N2 is VGL. Therefore, the transistor M7 is OFF. In response to the potential change at the node N1, the transistor M6 turns ON and the potential at the node QB changes to VGH because of the capacitive element C3. Since the potential at the node QB is VGH, the transistor M9 is ON.

As described above, the transistor M2 and M10 turn ON because of the reset signal, so that the potentials at the node Q and the output OUT_k are reset to VGL.

The clock signal CK1 changes from VGH to VGL before the time T12 as illustrated in FIG. 8 and as a result, the potential at the node N1 changes to VGL. The transistors M5 and M6 turn OFF. Furthermore, the potential at the node QB changes to VGL and the transistor M9 turns OFF. Since the reset signal RST keeps VGH, the transistors M2 and M10 remain ON.

Figure 9B:
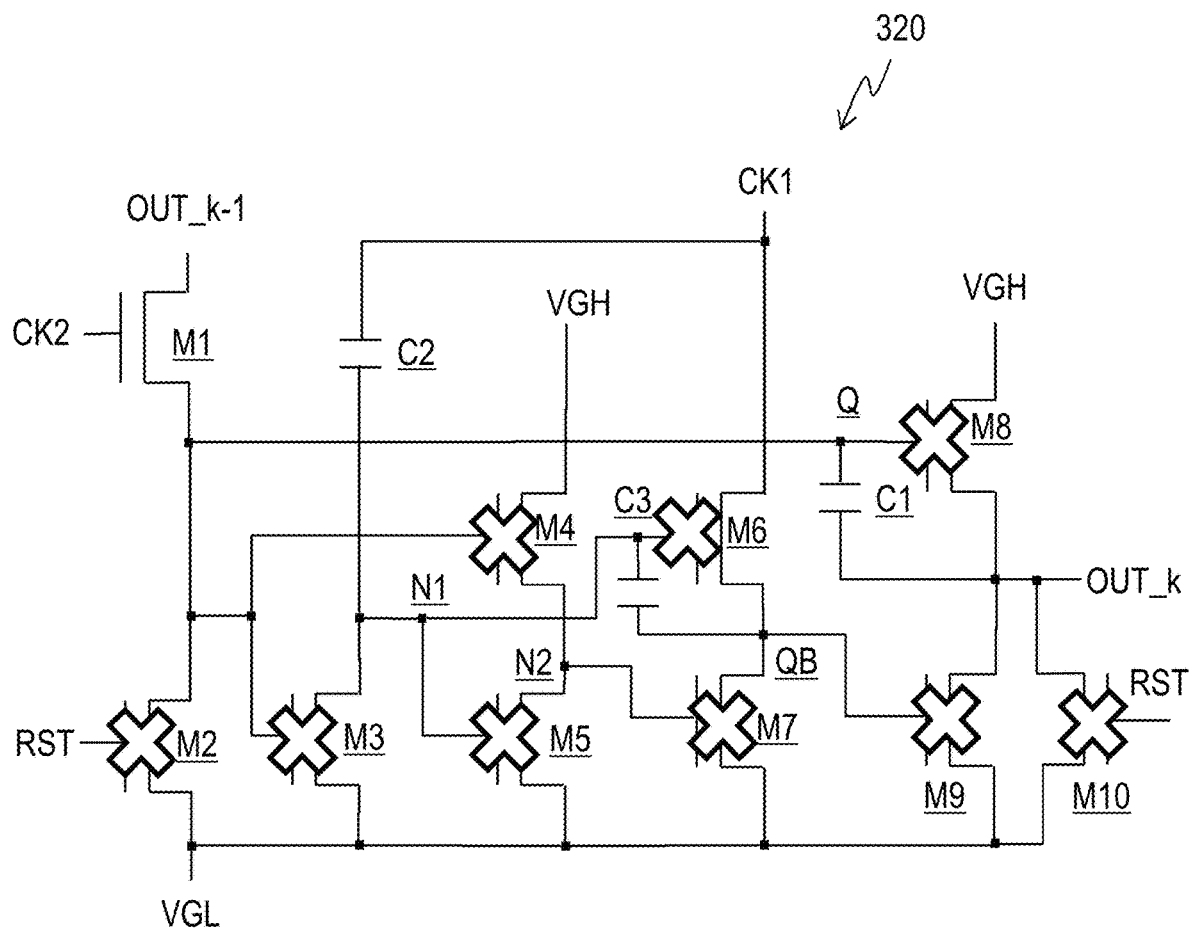
FIG. 9B illustrates another state of the shift register.

Next, operation in the period from the time T12 until the time T13 is described. The states of the transistors in the period from the time T14 until the time T15 are the same as those in this period and the changes of the signals are also the same, except that the reset signal RST keeps VGL. In this period, the node Q is refreshed to VGL. FIG. 9B illustrates the ON/OFF states of the transistors in the shift register 320 at the time T12.

With reference to FIG. 8, the reset signal RST changes from VGH to VGL at the time T12. As a result, the transistors M2 and M10 turn OFF. The clock signal CK2 changes from VGL to VGH. The clock signal CK1 keeps VGL. The input OUT_k−1 from the previous shift register also keeps VGL.

In response to the change of the clock signal CK2 to VGH, the transistor M1 turns ON. Since the input OUT_k−1 from the previous shift register is at VGL, the node Q is supplied with VGL (refreshed) and the transistor M8 is OFF. The transistors M3 and M4 are also OFF. The potential at the node N2 is kept at VGL and the transistor M7 is OFF.

Since the clock signal CK1 is at VGL, the potential at the node N1 is kept at VGL and the transistors M5 and M6 are OFF. The potential at the node QB is VGL and the transistor M9 is OFF. The output OUT_k keeps VGL.

The clock signal CK2 changes from VGH to VGL before the time T13, so that the transistor M1 turns OFF. However, the potentials at the nodes N1, N2, Q, and QB in the shift register 320 do not change. The states of the transistors other than the transistor M1 do not change either.

Figure 9C:
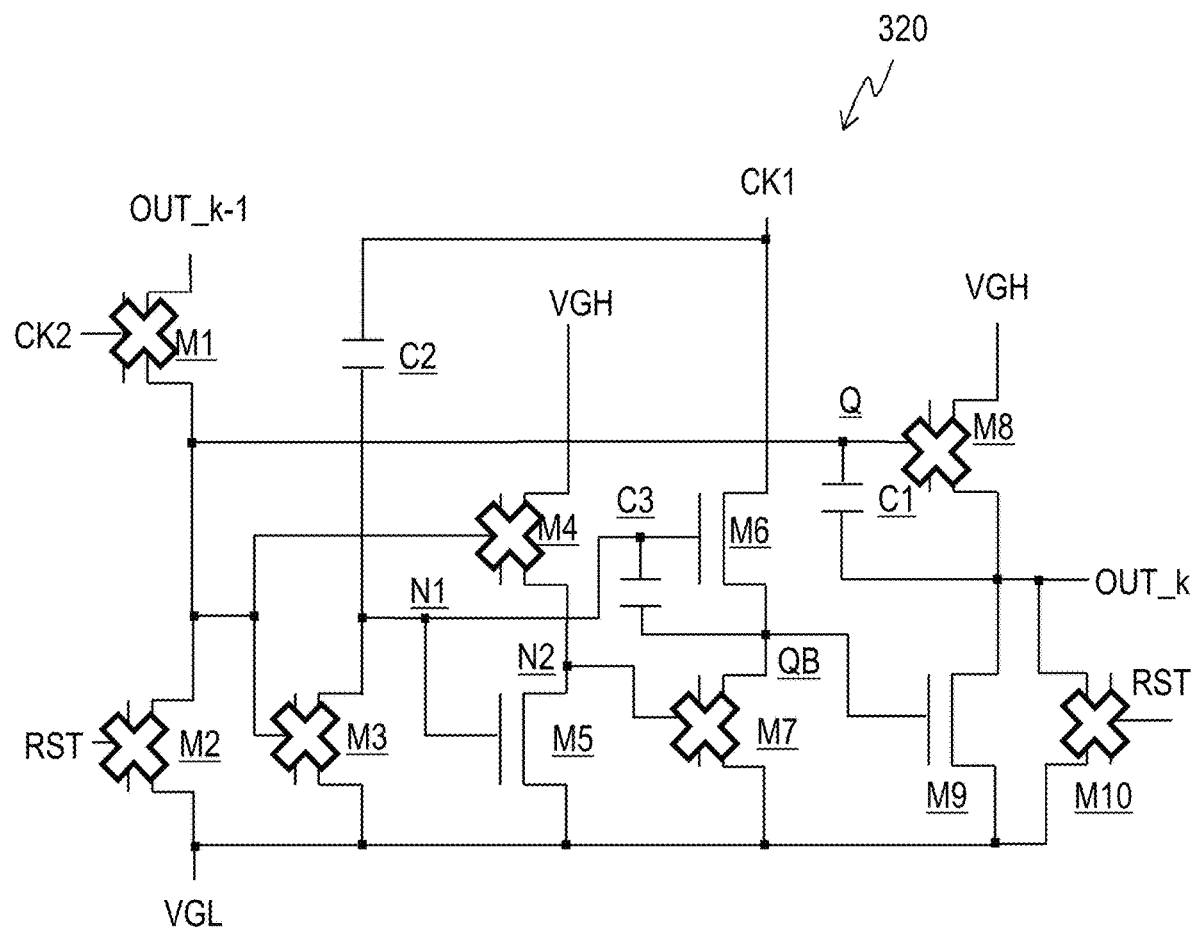
FIG. 9C illustrates still another state of the shift register.

Next, operation in the period from the time T15 until the time T16 is described. In this period, the output OUT_k is refreshed to VGL. FIG. 9C illustrates the ON/OFF states of the transistors in the shift register 320 at the time T15.

With reference to FIG. 8, the clock signal CK1 and the input OUT_k−1 from the previous shift register change from VGL to VGH at the time T15. Since the clock signal CK2 remains at VGL regardless of the change of the input OUT_k−1 from the previous shift register to VGH, the potential at the node Q is kept at VGL. In response to the change of the clock signal CK1 to VGH, the potential at the node N1 changes to VGH. As a result, the transistor M5 turns ON. In response to the change at the node N1, the transistor M6 turns ON and further, the potential at the node QB changes to VGH because of the capacitive element C3. As a result, the transistor M9 turns ON and the output OUT_k is supplied with VGL from the power line (refreshed).

The clock signal CK1 changes to VGL before the time T16. The input OUT_k−1 from the previous shift register remains at VGH. In response to the change of the clock signal CK1, the potential at the node N1 changes to VGL. The transistors M5 and M6 turn OFF. In response to the potential change at the node N1, the potential at the node QB changes to VGL and the transistor M9 turns OFF. The output line of the output OUT_k is in a floating state and the output OUT_k is kept at VGL.

Figure 9D:
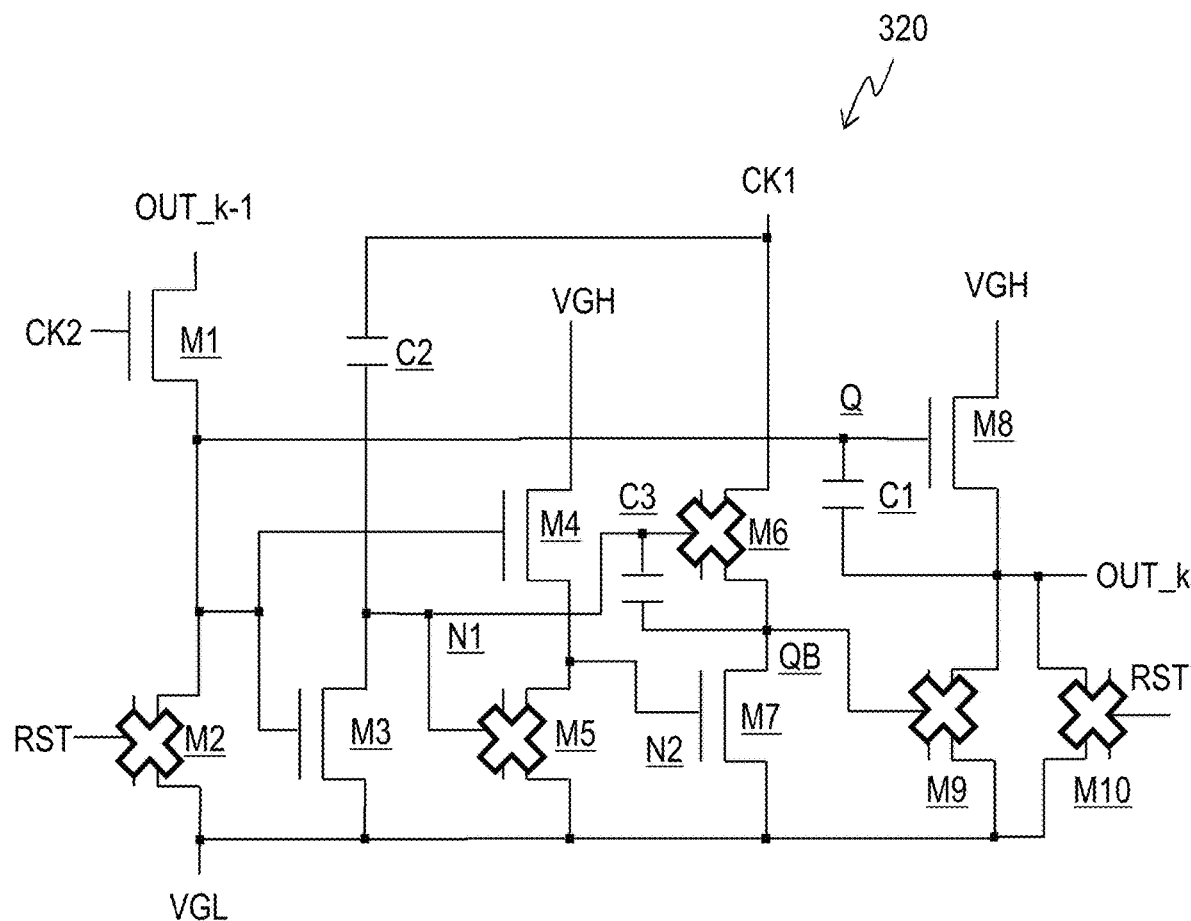
FIG. 9D illustrates still another state of the shift register.

Next, operation in the period from the time T16 until the time T17 is described. The output OUT_k inverts from VGL to VGH. FIG. 9D illustrates the ON/OFF states of the transistors in the shift register 320 at the time T16.

With reference to FIG. 8, the clock signal CK2 changes from VGL to VGH at the time T16. The transistor M1 turns ON as illustrated in FIG. 9D. Since the input OUT_k−1 from the previous shift register is at VGH, the transistor M3 turns ON. Since the potential at the node N1 is kept at VGL, the transistor M6 remains OFF.

Since the input OUT_k−1 from the previous shift register is at VGH, the transistor M4 turns ON. As a result, the potential at the node N2 changes from VGL to VGH. In response to the potential change at the node N2, the transistor M7 turns ON. Since the potential at the node QB is kept at VGL, the transistor M9 remains OFF.

Since the transistor M1 turns ON and the input OUT_k−1 from the previous shift register is at VGH, the potential at the node Q changes from VGL to VGH. The transistor M8 turns ON because of the bootstrap effect of the capacitive element C1 and the output OUT_k changes from VGL to VGH.

The clock signal CK2 changes from VGH to VGL before the time T17 and in response, the transistor M1 turns OFF. However, the potential at the node Q is kept at VGH. In the shift register 320, the node N1 is kept at VGL through the transistor M3, the node N2 is kept at VGH through the transistor M4, and the node QB is kept at VGL through the transistor M7. The states of the transistors other than the transistor M1 do not change. The output OUT_k is kept at VGH through the transistor M8.

Figure 9E:
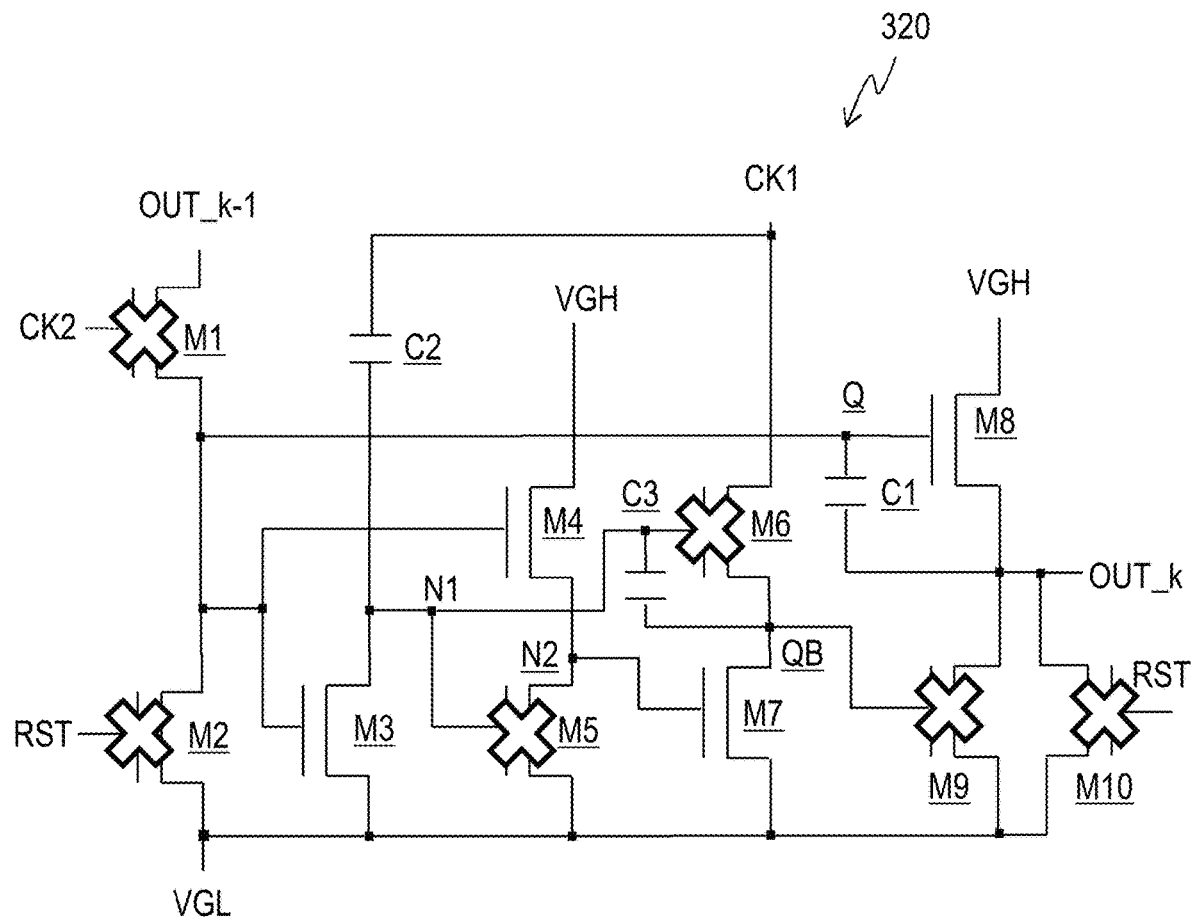
FIG. 9E illustrates still another state of the shift register.

Next, operation in the period from the time T17 until the time T18 is described. The output OUT_k is kept at VGH during this period. FIG. 9E illustrates the ON/OFF states of the transistors in the shift register 320 at the time T17.

With reference to FIG. 8, the clock signal CK1 changes from VGL to VGH at the time T17. The potential at the node Q is VGH (actually, a little higher than VGH) and the transistors M3 and M4 are ON as illustrated in FIG. 9E. Since the transistor M3 is ON, the potential at the node N1 is kept at VGL. The potential at the node QB is also kept at VGL and the transistor M9 is OFF. The clock signal CK1 changes to VGL before the time T18. However, The node potentials in the circuit in FIG. 8 do not change and neither do the states of the transistors.

Figure 9F:
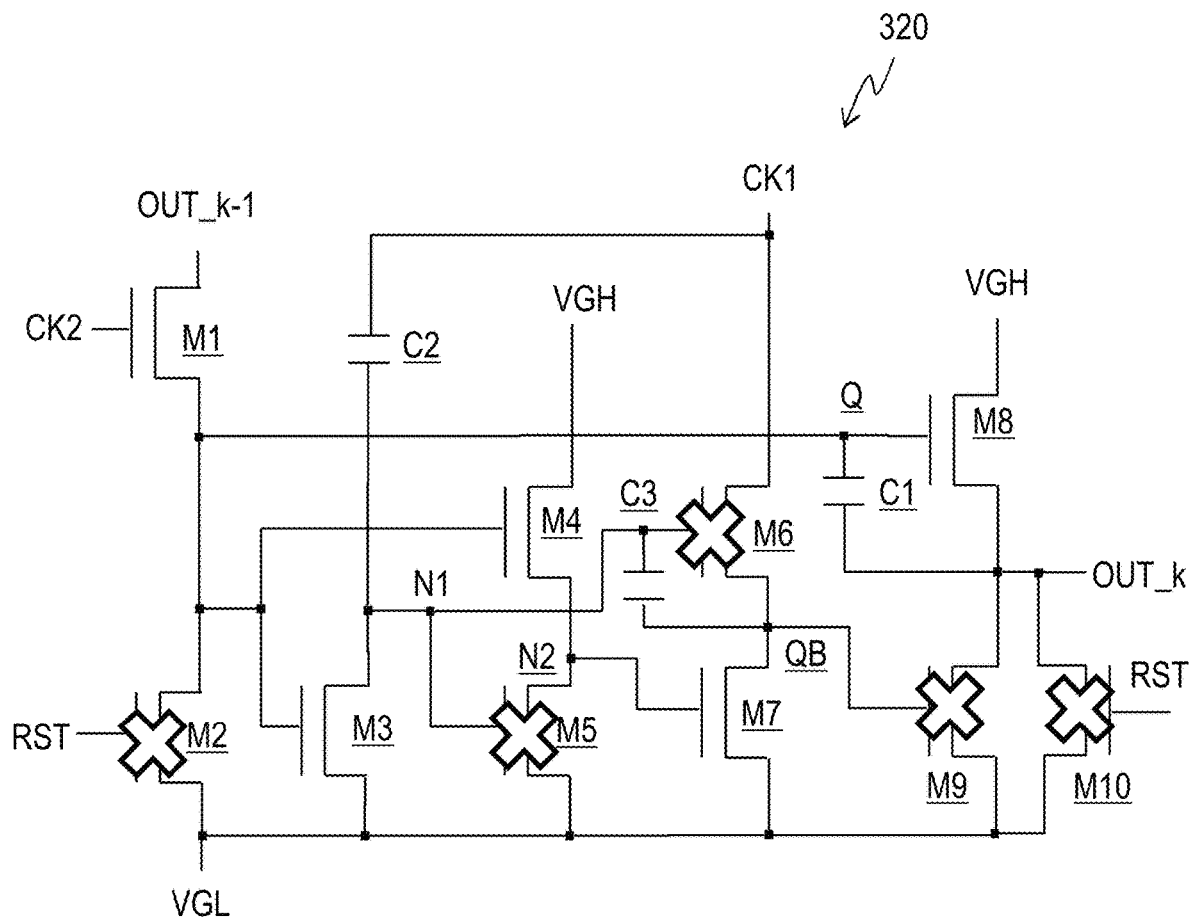
FIG. 9F illustrates still another state of the shift register.

Next, operation in the period from the time T18 until the time T19 is described. The output OUT_k is kept at VGH during this period. The potential at the node Q is refreshed to VGH. FIG. 9F illustrates the ON/OFF states of the transistors in the shift register 320 at the time T18.

With reference to FIG. 8, the clock signal CK2 changes from VGL to VGH at the time T18, so that the transistor M1 turns ON. Since the input OUT_k−1 from the previous shift register is at VGH, the potential at the node Q is refreshed to VGH. The node potentials in the circuit in FIG. 8 do not change and neither do the states of the other transistors. The output OUT_k is kept at VGH.

The clock signal CK2 changes from VGH to VGL before the time T19, so that the transistor M1 turns OFF. The node potentials in the circuit in FIG. 8 do not change and neither do the states of the other transistors. The output OUT_k is kept at VGH.

Next, operation in the period from the time T19 until the time T20 is described. The clock signal CK1 changes from VGL to VGH at the time T19 and further, changes from VGH to VGL before the time T20. Regardless of the changes of the clock signal CK1, The node potentials in the circuit in FIG. 8 do not change and neither do the states of the transistors.

Figure 9G:
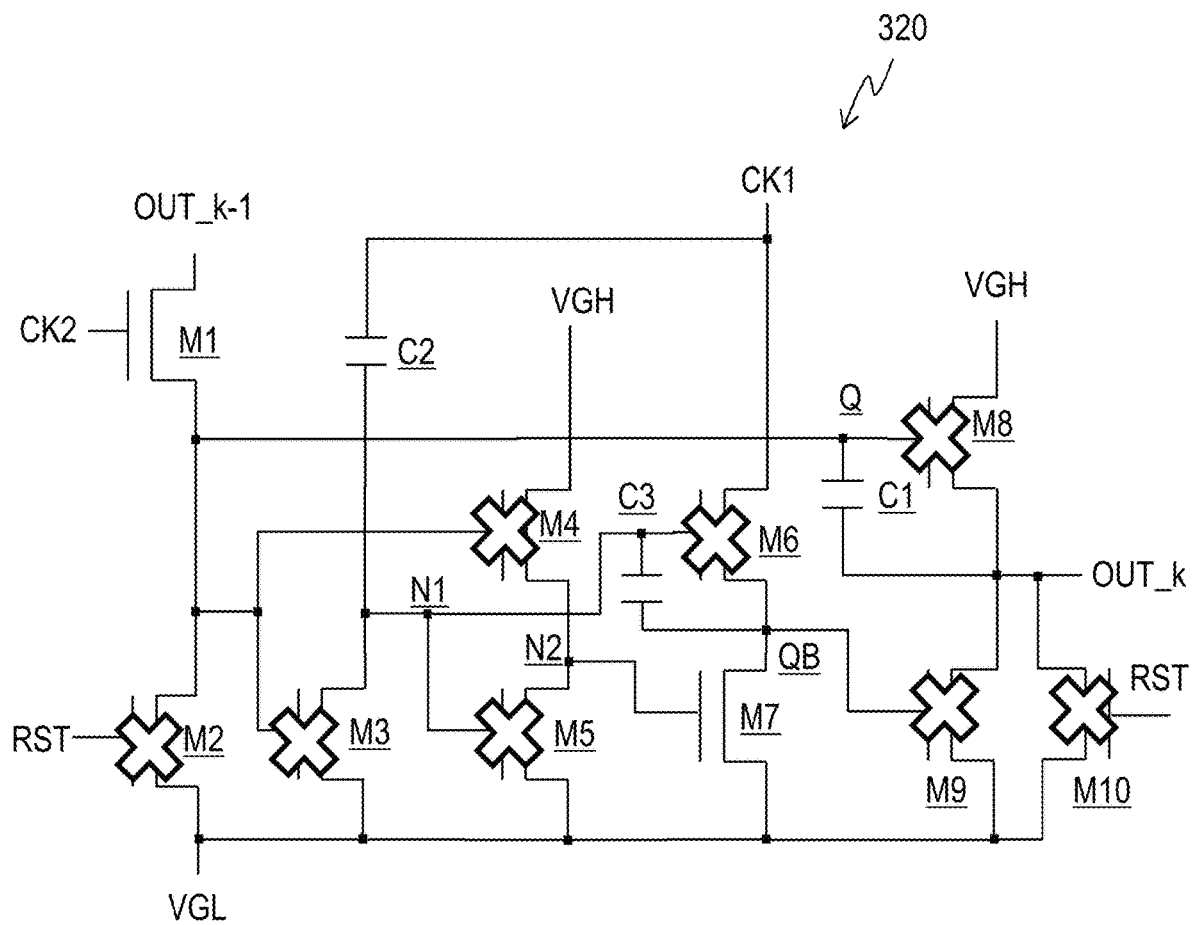
FIG. 9G illustrates still another state of the shift register.

Next, operation in the period from the time T20 until the time T21 is described. The output OUT_k is kept at VGH during this period. The transistors M4 and M8 turn OFF. FIG. 9G illustrates the ON/OFF states of the transistors in the shift register 320 at the time T20.

At the time T20, the input OUT_k−1 from the previous shift register changes from VGH to VGL. In response to the change of the clock signal CK2 from VGL to VGH, the transistor M1 turns ON. Since the input OUT_k−1 from the previous shift register is at VGL, the potential at the node Q changes from VGH to VGL. As a result, the transistors M3, M4, and M8 turn OFF. However, the output OUT_k is kept at VGH because of the capacitance of the output line. The potential at the node N1 is kept at VGL and the potential at the node N2 is kept at VGH.

The clock signal CK2 changes from VGH to VGL before the time T21, so that the transistor M1 turns OFF. The node potentials in the circuit in FIG. 8 do not change and neither do the states of the other transistors. The output OUT_k is kept at VGH.

Figure 9H:
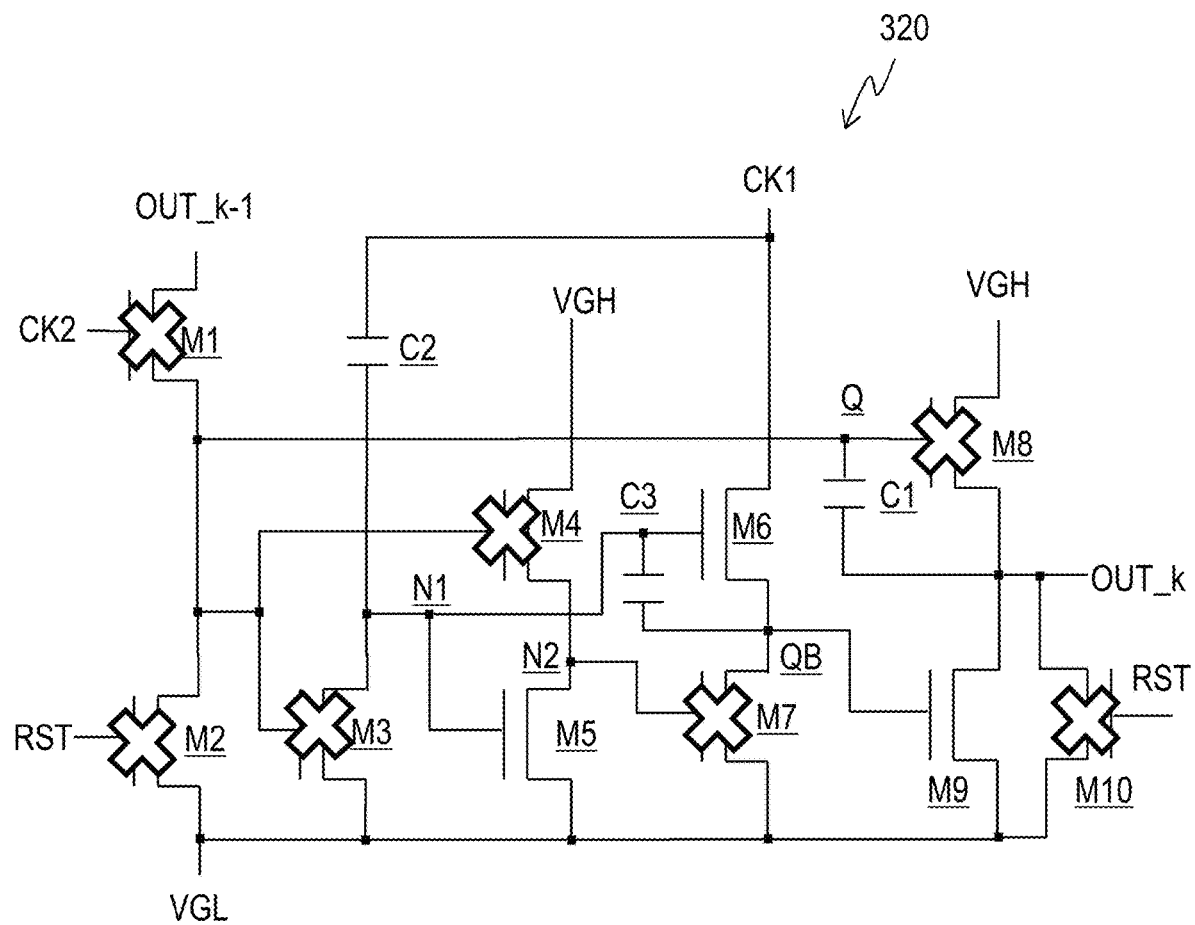
FIG. 9H illustrates still another state of the shift register.

Next, operation in the period from the time T21 until the time T22 is described. In this period, the output OUT_k inverts from VGH to VGL. FIG. 9H illustrates the ON/OFF states of the transistors in the shift register 320 at the time T21.

With reference to FIG. 8, the clock signal CK1 changes from VGL to VGH at the time T21. As a result, the potential at the node N1 changes from VGL to VGH. In response to the potential change at the node N1, the transistor M5 turns ON. The transistor M6 also turns ON in response to the potential change at the node N1.

When the transistor M5 turns ON, the node N2 is supplied with VGL from the low-power line and the potential there changes from VGH to VGL. When the transistor M6 turns ON, the node QB is supplied with VGH of the clock signal CK1 and the potential there changes from VGL to VGH. In response to the change of the potential at the node QB from VGL to VGH, the transistor M9 turns ON. As a result, the output OUT_k changes from VGH to VGL.

The clock signal CK1 changes from VGH to VGL before the time T22. As a result, the potentials at the nodes N1 and QB change from VGH to VGL. In response to the potential change at the node N1, the transistors M5 and M6 turn OFF. In response to the potential change at the node QB, the transistor M9 turns OFF. Although the output OUT_k is in a floating state, it keeps VGL because of the capacitance of the output line.

Figure 9I:
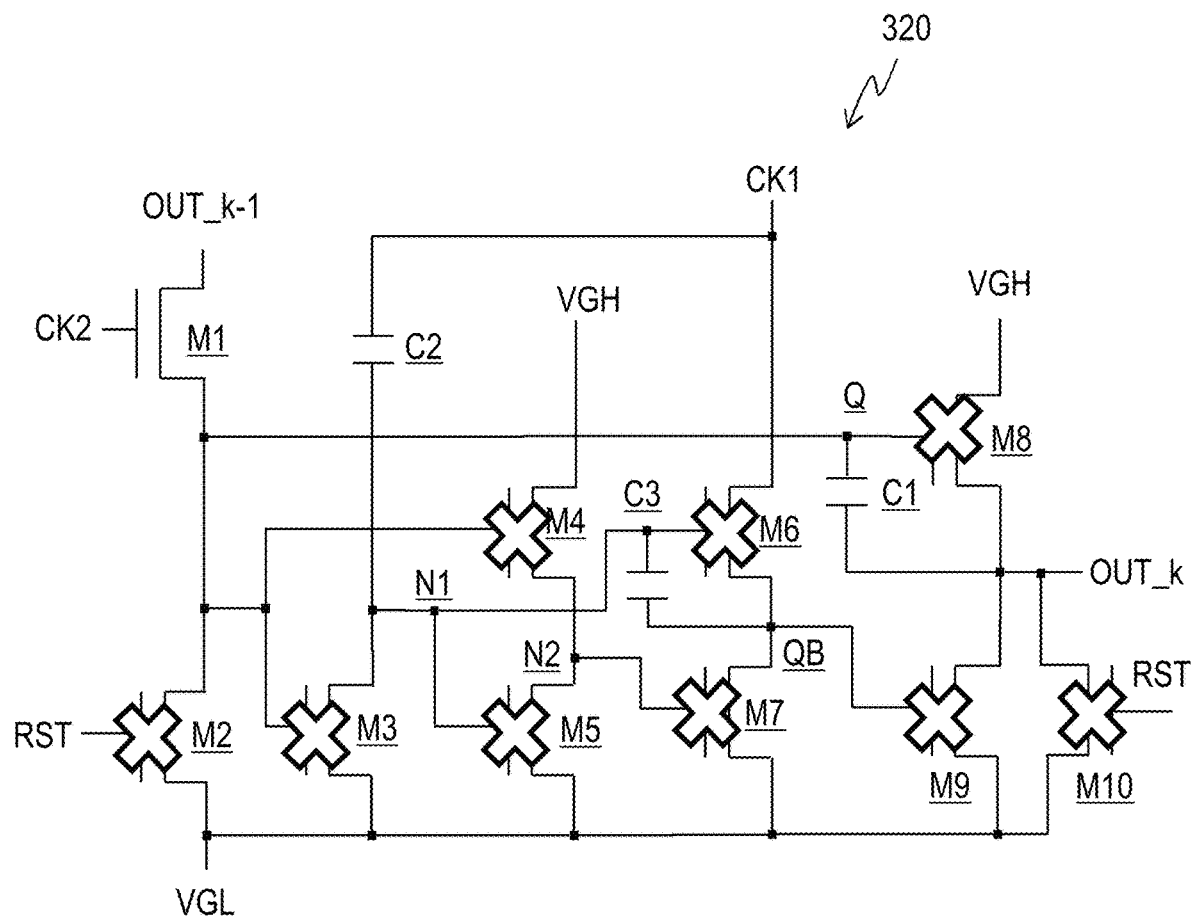
FIG. 9I illustrates still another state of the shift register.

Next, operation in the period from the time T22 until the time T23 is described. In this period, the potential at the node Q is refreshed to VGL. The output OUT_k keeps VGL. FIG. 9I illustrates the ON/OFF states of the transistors in the shift register 320 at the time T22.

With reference to FIG. 8, the clock signal CK2 changes from VGL to VGH at the time T22. The transistor M1 turns ON as illustrated in FIG. 9I. Since the input OUT_k−1 from the previous shift register is at VGL, the potential VGL at the node Q is refreshed to VGL. The node potentials in the circuit in FIG. 8 do not change and neither do the states of the other transistors.

The clock signal CK2 changes from VGH to VGL before the time T23. In response to the change of the clock signal CK2, the transistor M1 turns OFF. The node potentials in the circuit in FIG. 8 do not change and neither do the states of the other transistors. The output OUT_k is kept at VGL.

Figure 9J:
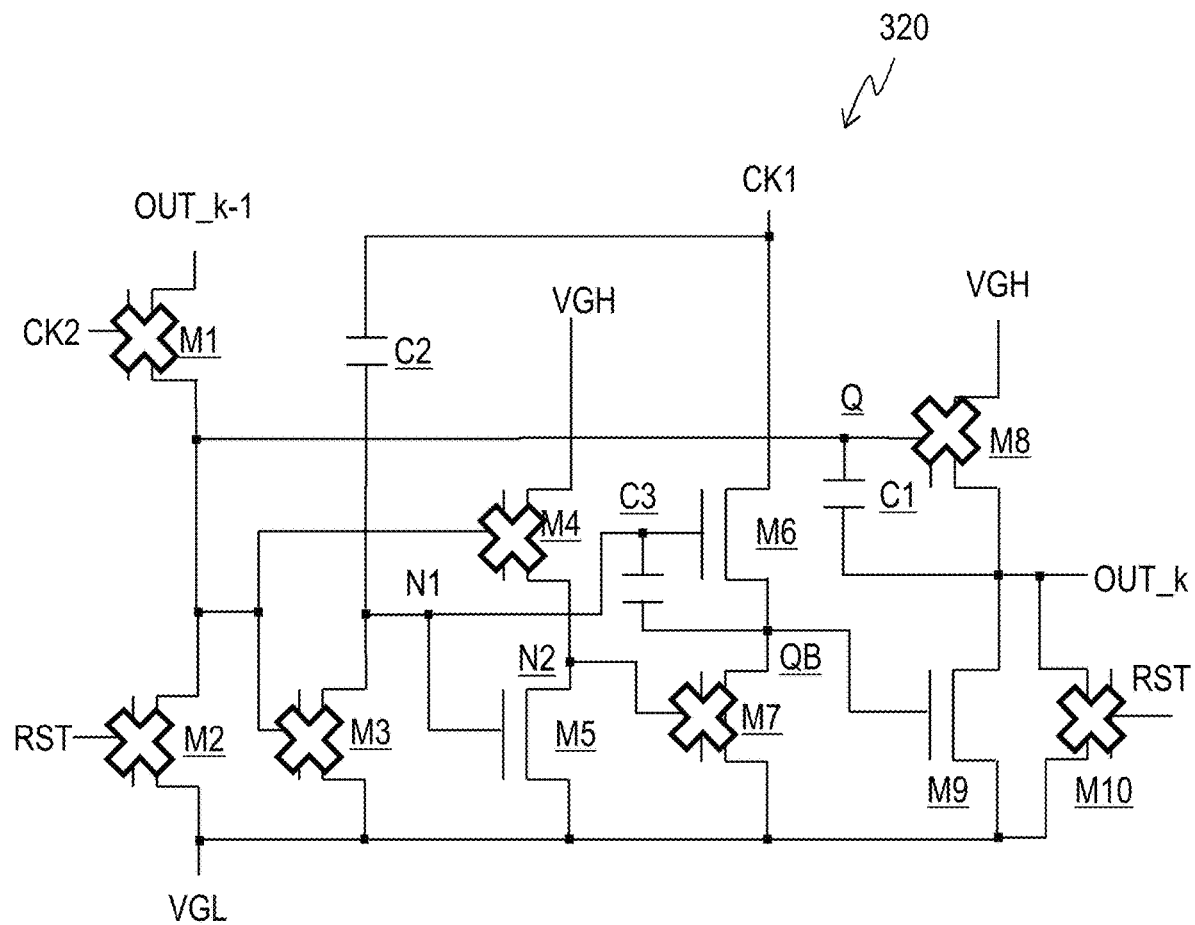
FIG. 9J illustrates still another state of the shift register.

Next, operation in the period from the time T23 until the time T24 is described. In this period, the output OUT_k at VGL is refreshed to VGL. FIG. 9J illustrates the ON/OFF states of the transistors in the shift register 320 at the time T23.

The clock signal CK1 changes from VGL to VGH at the time T23. In response to the change of the clock signal CK1, the potential at the node N1 changes from VGL to VGH. The transistor M6 turns ON and the potential at the node QB changes from VGL to VGH. In response to the potential change at the node QB, the transistor M9 turns ON. The transistor M9 supplies VGL from the low-power line to the output line and refreshes the output OUT_k (at VGL) to VGL.

The clock signal CK1 changes from VGH to VGL before the time T24. As a result, the potentials at the nodes N1 and QB change from VGH to VGL. In response to the potential change at the node N1, the transistors M5 and M6 turn OFF. In response to the potential change at the node QB, the transistor M9 turns OFF. The output OUT_k is in a floating state and keeps VGL because of the capacitance of the output line. Subsequently, the operation in the period from the time T22 until the time T24 is repeated until the time T11 of the next frame.

The on-duties of the transistors in the shift register 320 are described. The on-duty is the rate of the period where the transistor is ON in one frame period of operation of the shift register. As described above, the transistor M1 is controlled by the clock signal CK2. The transistors M2 and M10 are controlled by the reset signal RST. The transistors M3, M4, and M8 are controlled by the potential at the node Q. The transistors M5 and M6 are controlled by the potential at the node N1. The transistor M7 is controlled by the potential at the node N2. The transistor M9 is controlled by the potential at the node QB.

Since all transistors in the shift register 320 are n-type transistors, the high-duty (H-duty) or the rate of the period where the gate signal (control signal) is high (at VGH) corresponds to the on-duty of the transistor.

With reference to FIG. 8, the clock signals CK1 and CK2 have the longest total VGH periods among the reset signal RST, the clock signals CK1 and CK2, and the potentials at the nodes N1, N2, Q, and QB. Although the H-duties of the clock signals CK1 and CK2 depend on the lengths of their clock pulses per 1H period, they are not more than 50%.

Next, the relation among the shift registers 300, 310, and 320 is described. The timing chart of the signals of FIG. 8 is also applicable to the shift registers 300 and 310, except for the reset signal.

First, the shift register 310 in FIG. 6 is compared with the shift register 320 in FIG. 7. The shift register 310 does not include the transistors M2 and M10 in the shift register 320. The configuration other than these transistors M2 and M10 is common to the two shift registers. The transistors M2 and M10 are controlled by the reset signal. The shift register 320 resets the potentials at the node Q and the output OUT_k to VGL (low potential) in each frame. Through this operation, the shift register 320 prevents erroneous operation of the scanning circuit and increases the stability.

The reset signal RST is, however, not input to the shift register 310. That is to say, the shift register 310 does not need a reset signal. Hence, the shift register 310 can have a simpler circuit configuration.

Next, the shift register 300 in FIG. 5 is compared with the shift register 320 in FIG. 7. Like the shift register 310 in FIG. 6, the shift register 300 does not include the transistors M2 and M10 in the shift register 320. In addition, the shift register 300 includes a transistor M11 in place of the capacitive element C2 in the shift register 320. The transistor M11 is controlled by the clock signal CK1 and one end of the source/drain is connected to a high-power line and the other end is connected to the node N1.

The operation of the transistor M11 is described. The transistor M11 is turned ON/OFF by the clock signal CK1. With reference to FIG. 8, when the clock signal CK1 changes from VGL to VGH at the time T17, the transistor M11 turns ON. However, the node N1 is kept at VGL because the transistor M3 remains ON at the same time. It is preferable that the transistor M3 have a low resistance. Specifically, the transistor M3 can have a low resistance by having a sufficiently wide channel width, compared to the transistor M11. In this condition, however, through-current flows from the high-power line to the low-power line through the transistors M11 and M3.

On the other hand, the shift register 310 in FIG. 6 and the shift register 320 in FIG. 7 include a capacitive element C2 in place of the transistor M11. This configuration enables the potential at the node N1 to change in accordance with the clock signal CK1 without reducing the impedance and as a result, the through-current is suppressed.

The state at the time T17 continues until the clock signal CK1 changes to VGL before the time T18. The same state also appears in the period from the time T19 until the clock signal CK1 changes to VGL before the time T20.

After the time T21, the input OUT_k−1 from the previous shift register is at VGL and the transistor M3 is OFF (see FIGS. 9H to 9J). The potential level at the node N1 changes in the same manner as the potential level of the clock signal CK1 after the time T21. When the clock signal CK1 is at VGH, the transistor M11 is ON and the node N1 is supplied with VGH from the high-power line. When the clock signal CK1 subsequently changes to VGL, the potential at the node N1 changes to VGL through the transistor M11 and the gate capacitance of the transistor M6. Such repetitive changes of the potential level at the node N1 between VGH and VGL reduce the on-duty of the transistor M6.

FIGS. 10A to 10J illustrate temporal variation of the potentials at the gates, sources, and drains of the transistors M1 to M10 that operate in accordance with the timing chart of FIG. 8. As indicated in FIGS. 10A to 10J, the H-duties of the transistors in a shift register are not more than 27%. Specifics are described in the following.

Figure 10A:
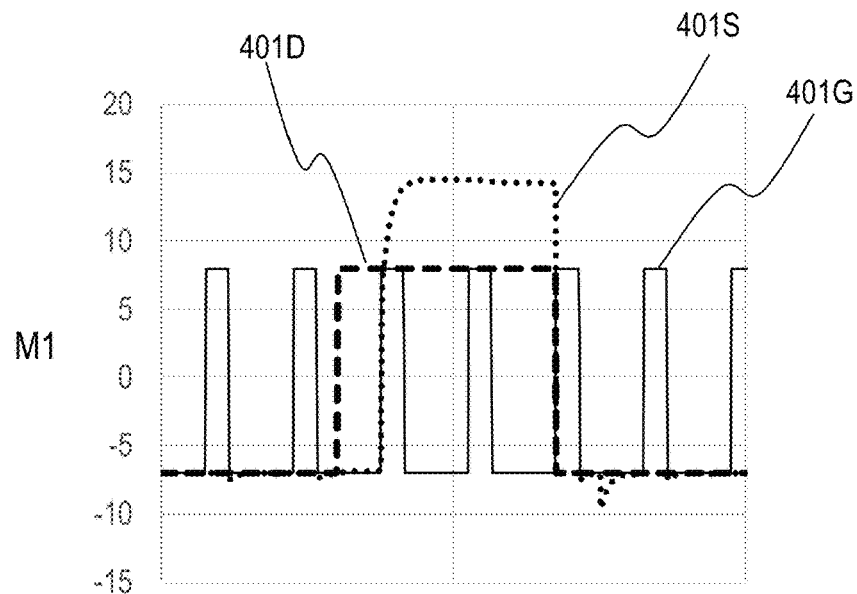
FIG. 10A illustrates variation of the potentials at the gate, source, and drain of one transistor in a shift register.
Figure 10B:
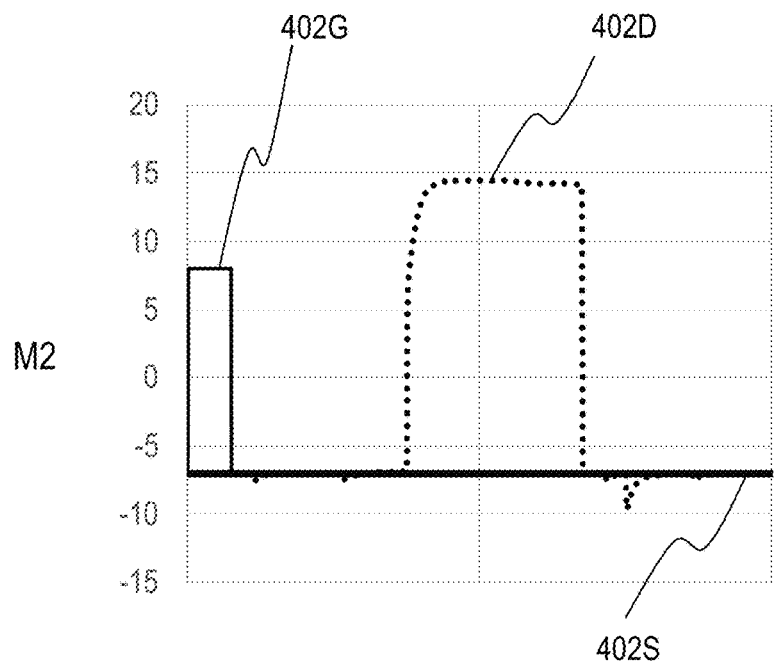
FIG. 10B illustrates variation of the potentials at the gate, source, and drain of another transistor in the shift register.

In FIG. 10A, the curves 401G, 401S, and 401D represent temporal variation of the potentials at the gate, source, drain of the transistor M1. The H-duty of the transistor M1 is 26.67%. In FIG. 10B, the curves 402G, 402S, and 402D represent temporal variation of the potentials at the gate, source, drain of the transistor M2. The H-duty of the transistor M2 is 0.04%.

Figure 10C:
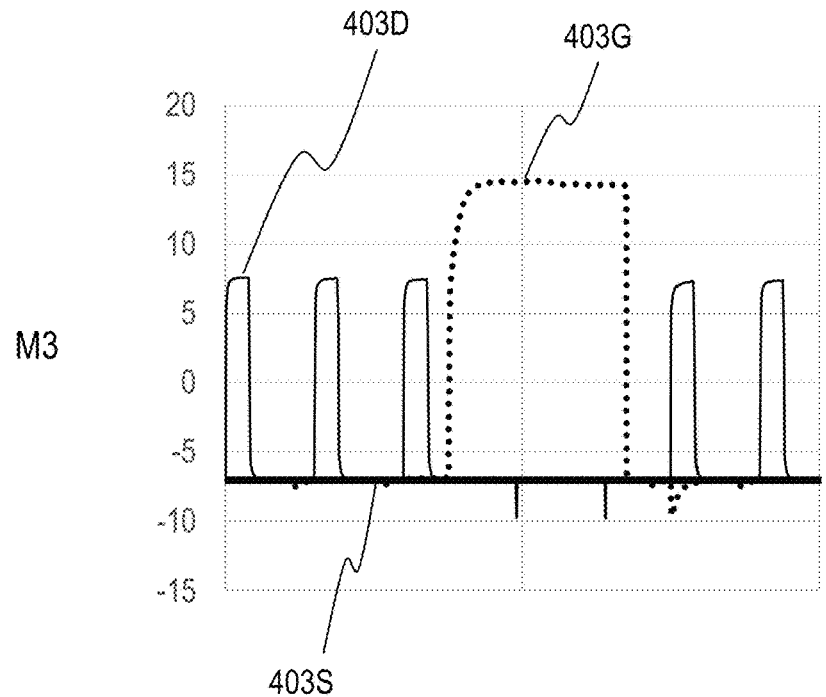
FIG. 10C illustrates variation of the potentials at the gate, source, and drain of still another transistor in the shift register.
Figure 10D:
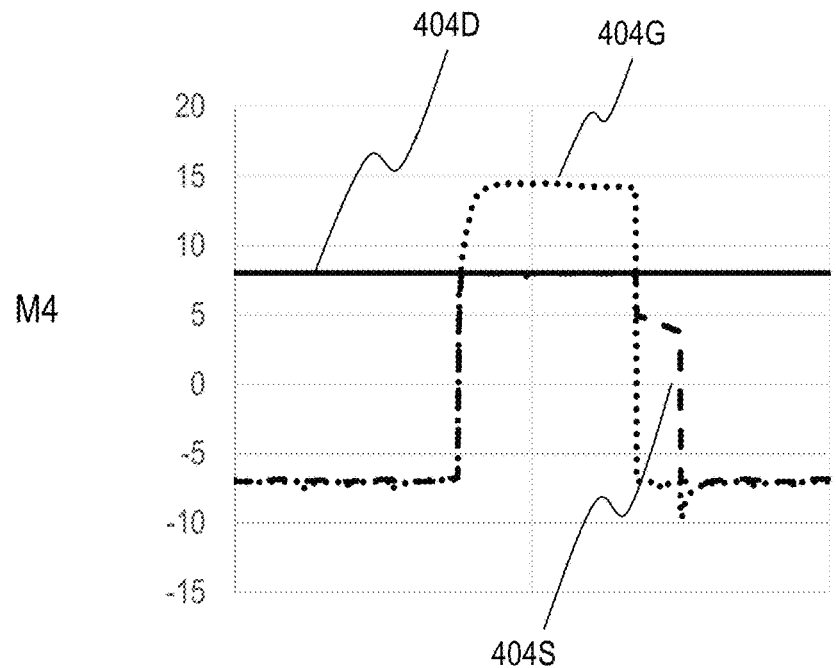
FIG. 10D illustrates variation of the potentials at the gate, source, and drain of still another transistor in the shift register.

In FIG. 10C, the curves 403G, 403S, and 403D represent temporal variation of the potentials at the gate, source, drain of the transistor M3. The H-duty of the transistor M3 is 0.19%. In FIG. 10D, the curves 404G, 404S, and 404D represent temporal variation of the potentials at the gate, source, drain of the transistor M4. The H-duty of the transistor M4 is 0.19%.

Figure 10E:
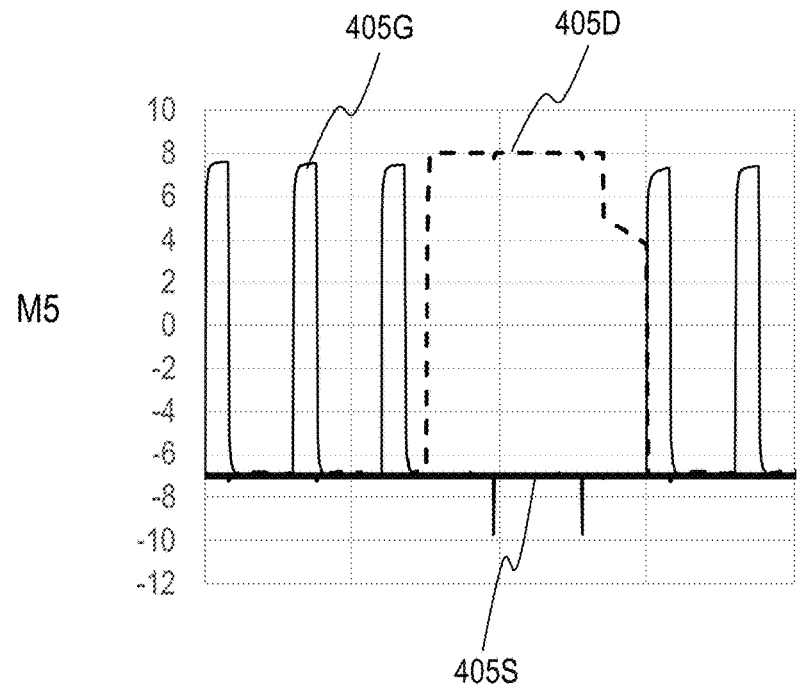
FIG. 10E illustrates variation of the potentials at the gate, source, and drain of still another transistor in the shift register.
Figure 10F:
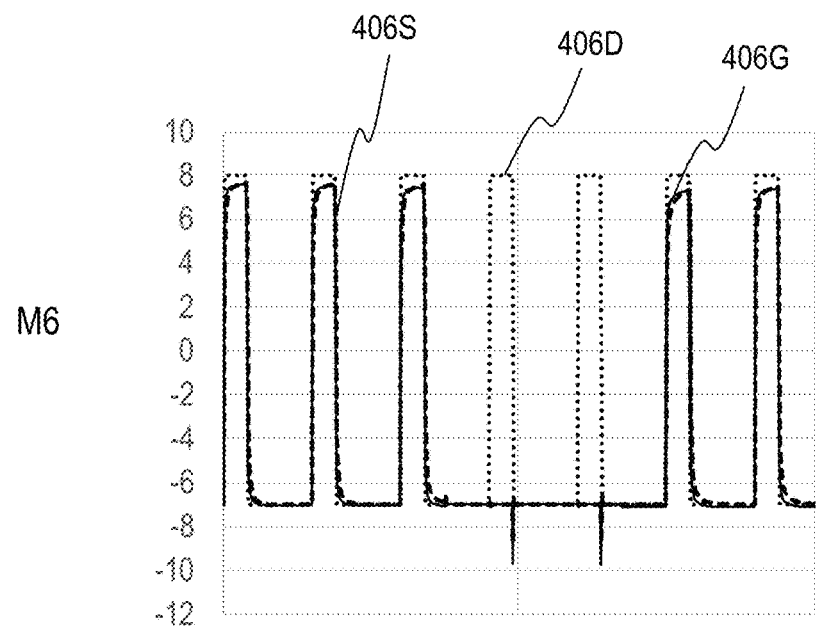
FIG. 10F illustrates variation of the potentials at the gate, source, and drain of still another transistor in the shift register.

In FIG. 10E, the curves 405G, 405S, and 405D represent temporal variation of the potentials at the gate, source, drain of the transistor M5. The H-duty of the transistor M5 is 26.67%. In FIG. 10F, the curves 406G, 406S, and 406D represent temporal variation of the potentials at the gate, source, drain of the transistor M6. The H-duty of the transistor M6 is 0%.

Figure 10G:
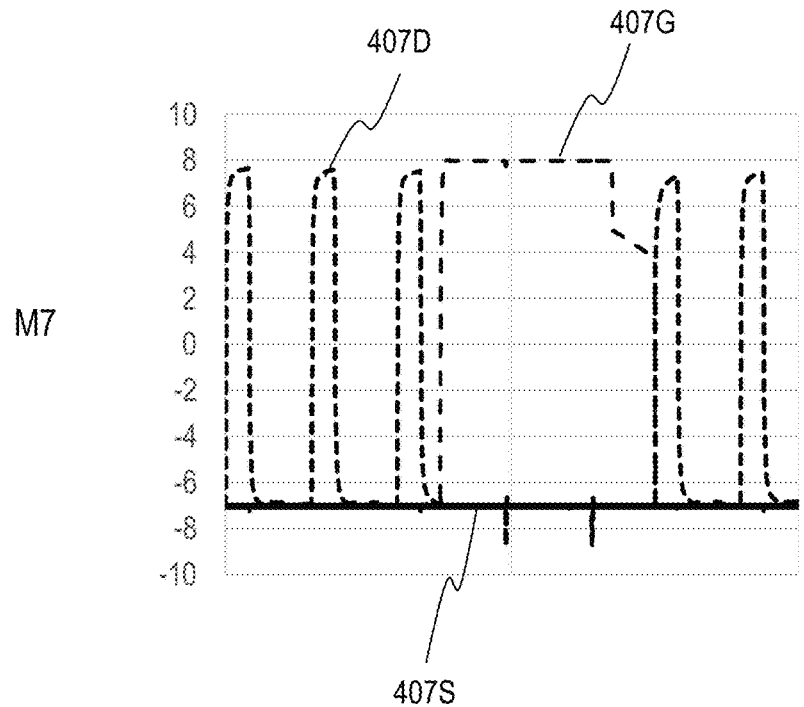
FIG. 10G illustrates variation of the potentials at the gate, source, and drain of still another transistor in the shift register.
Figure 10H:
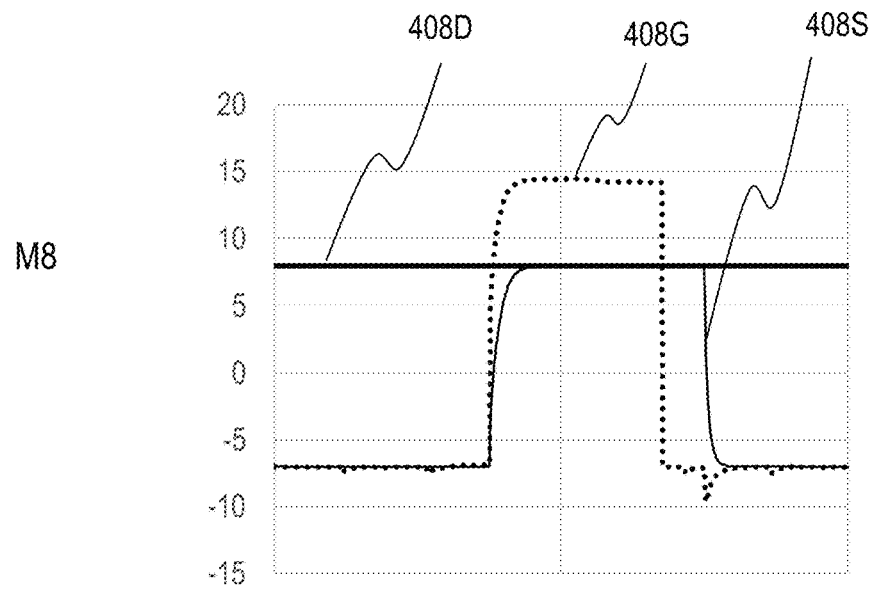
FIG. 10H illustrates variation of the potentials at the gate, source, and drain of still another transistor in the shift register.

In FIG. 10G, the curves 407G, 407S, and 407D represent temporal variation of the potentials at the gate, source, drain of the transistor M7. The H-duty of the transistor M7 is 0.19%. In FIG. 10H, the curves 408G, 408S, and 408D represent temporal variation of the potentials at the gate, source, drain of the transistor M8. The H-duty of the transistor M8 is 0.19%.

Figure 10I:
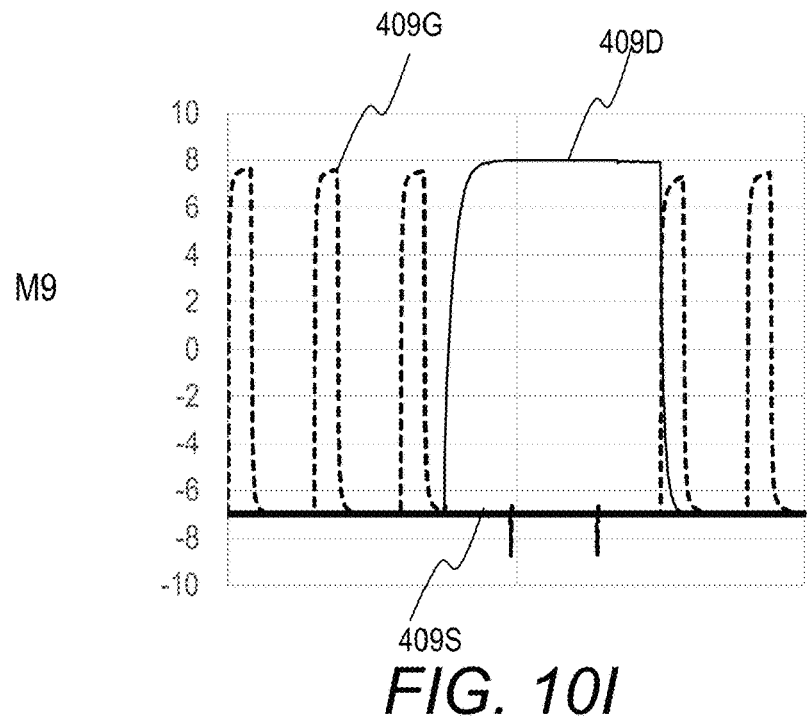
FIG. 10I illustrates variation of the potentials at the gate, source, and drain of still another transistor in the shift register.
Figure 10J:
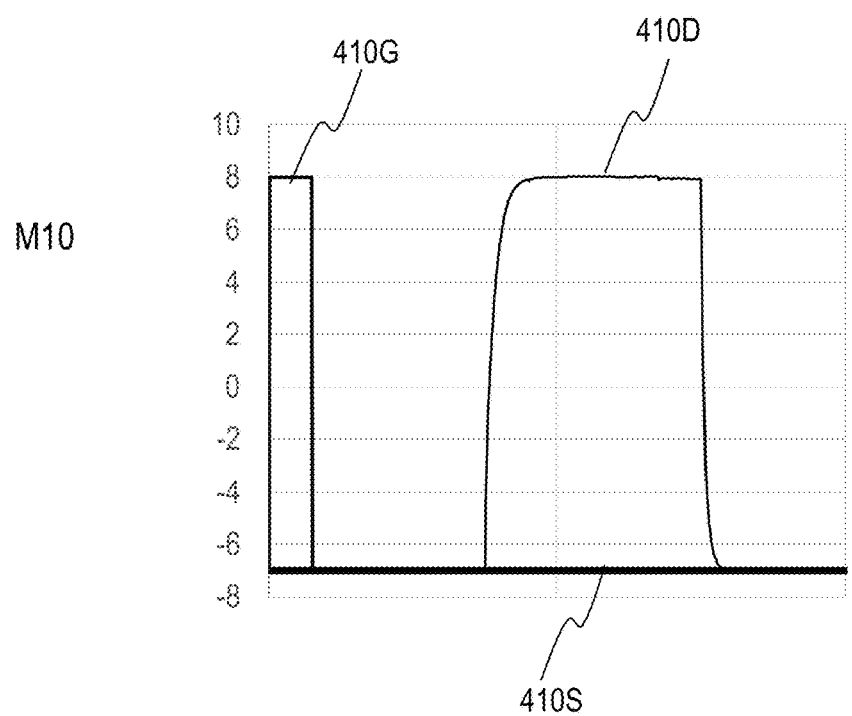
FIG. 10J illustrates variation of the potentials at the gate, source, and drain of still another transistor in the shift register.

In FIG. 10I, the curves 409G, 409S, and 409D represent temporal variation of the potentials at the gate, source, drain of the transistor M9. The H-duty of the transistor M9 is 26.67%. In FIG. 10J, the curves 410G, 410S, and 410D represent temporal variation of the potentials at the gate, source, drain of the transistor M10. The H-duty of the transistor M10 is 0.04%.

Figure 11:
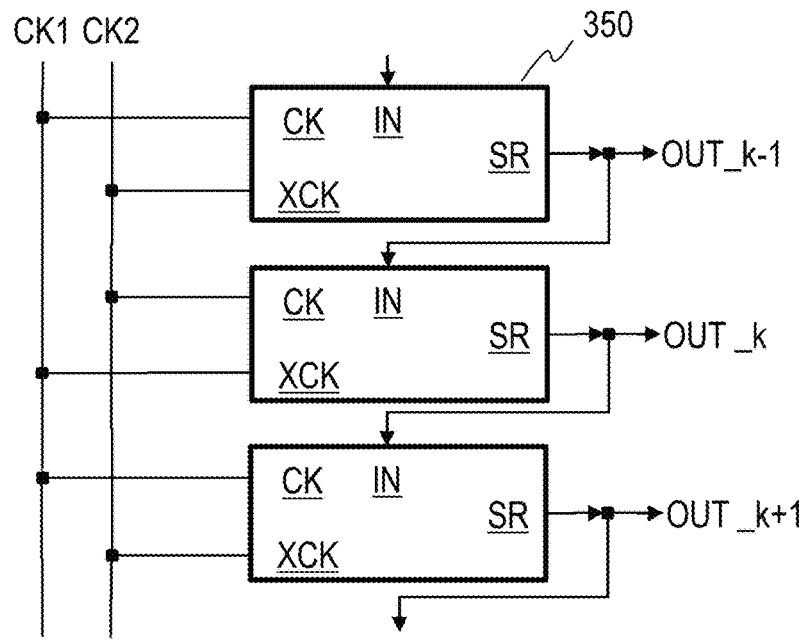
FIG. 11 illustrates the (k−1)th, the k-th, and the (k+1)th shift registers and input and output signals of each shift register.

Hereinafter, the relation between the number of phases of the clock for controlling a scanning circuit and the H-duties of signals of a shift register (including input signals and internally generated signals) is described. FIG. 11 illustrates a partial configuration of a scanning circuit (the scanning circuit 133) to be controlled by a two-phase clock. Specifically, FIG. 11 illustrates the (k−1)th, k-th, and (k+1)th shift registers 350 and input and output signals of each shift register 350. FIG. 11 provides the (k−1)th shift register with a reference sign 350 by way of example. The shift register 350 can have a circuit configuration illustrated in any of FIGS. 5 to 7.

Each shift register 350 includes a first clock terminal CK, a second clock terminal XCK, an input terminal IN, and an output terminal SR. The first clock terminal CK and the second clock terminal XCK receive the first clock signal CK1 or the second clock signal CK2. The input terminal IN receives the output signal from the previous shift register 350. The input terminal IN of the first shift register 350 receives a start signal. The output terminal SR outputs an output signal OUT.

Figure 12:
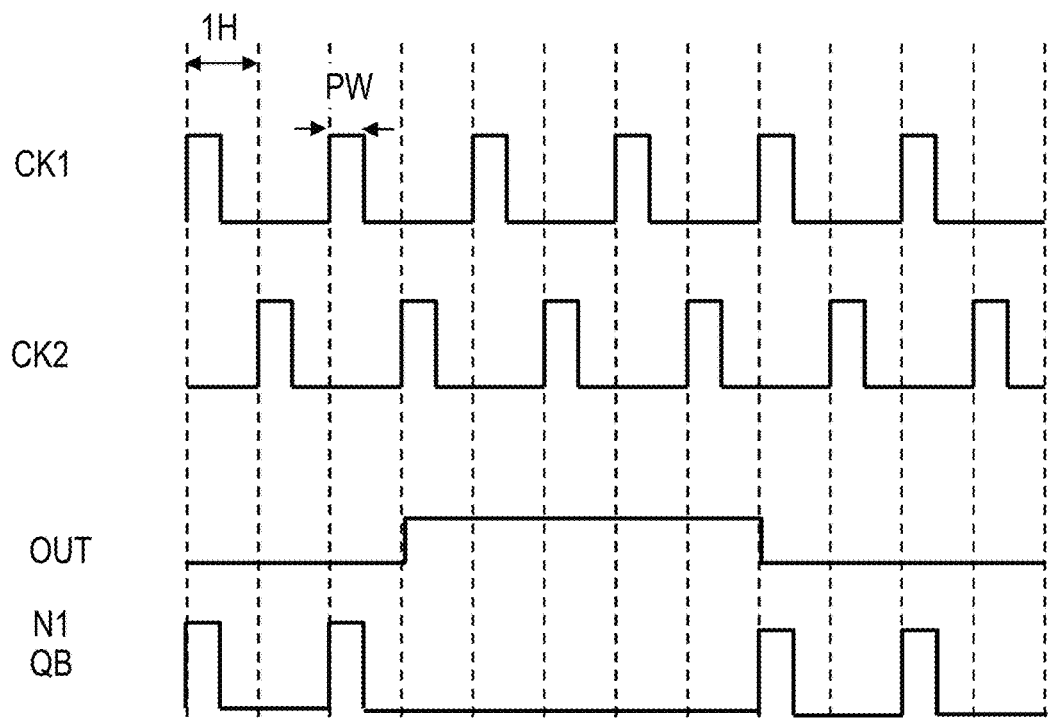
FIG. 12 illustrates temporal variation of some signals of a shift register in FIG. 11.

FIG. 12 illustrates temporal variation of some signals of a shift register in FIG. 11, specifically, temporal variation of the clock signals CK1 and CK2, the output signal OUT, and the potentials at the nodes N1 and QB. Each interval between broken lines corresponds to 1H period. The clock signals CK1 and CK2 have a pulse width PW. The temporal variation of each signal (potential) is the same as the corresponding one in FIG. 8.

Figure 13:
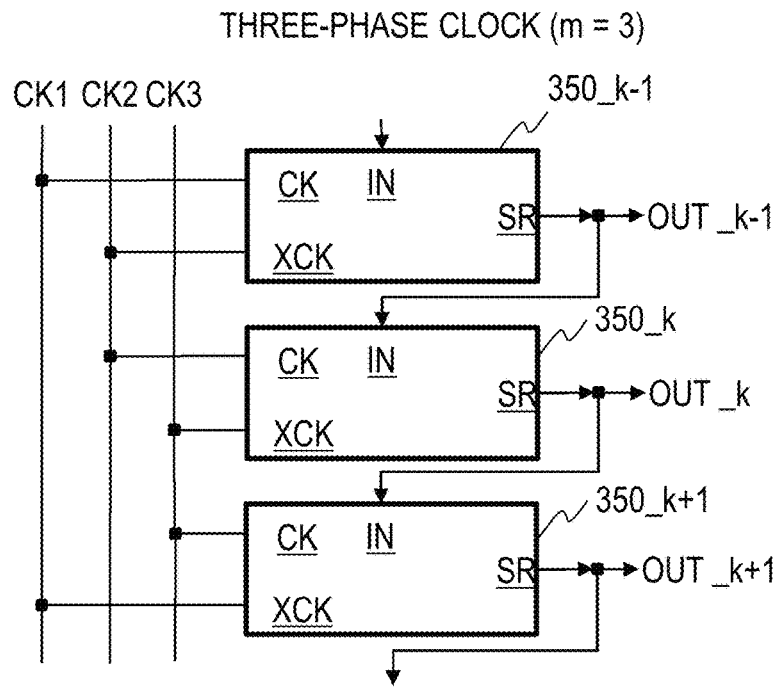
FIG. 13 illustrates a partial configuration of a scanning circuit to be controlled by a three-phase clock.

FIG. 13 illustrates a partial configuration of another scanning circuit to be controlled by a three-phase clock. Specifically, FIG. 13 illustrates the (k−1)th, k-th, and (k+1) th shift registers 350 (350_k−1, 350_k, and 350_k+1) and input and output signals of each shift register 350. The terminal configuration of each shift register 350 is the same as the one of the shift register 350 in FIG. 11. Each shift register 350 can have a circuit configuration illustrated in any of FIGS. 5 to 7.

Each shift register 350 is controlled by a three-phase clock. The first clock terminals CK of three consecutive shift registers 350 receive different clock signals and their second clock terminals XCK receive different clock signals.

In the example of FIG. 13, the first clock terminal CK of the (k−1)th shift register 350_k−1 receives the first clock signal CK1 and its second clock terminal XCK receives the second clock signal CK2. The first clock terminal CK of the k-th shift register 350_k receives the second clock signal CK2 and its second clock terminal XCK receives the third clock signal CK3. The first clock terminal CK of the (k+1)th shift register 350_k+1 receives the third clock signal CK3 and its second clock terminal XCK receives the first clock signal CK1.

The input terminal IN of each shift register 350 receives the output signal from the previous shift register 350. The input terminal IN of the first shift register 350 receives a start signal. The output terminal SR outputs an output signal OUT.

Figure 14:
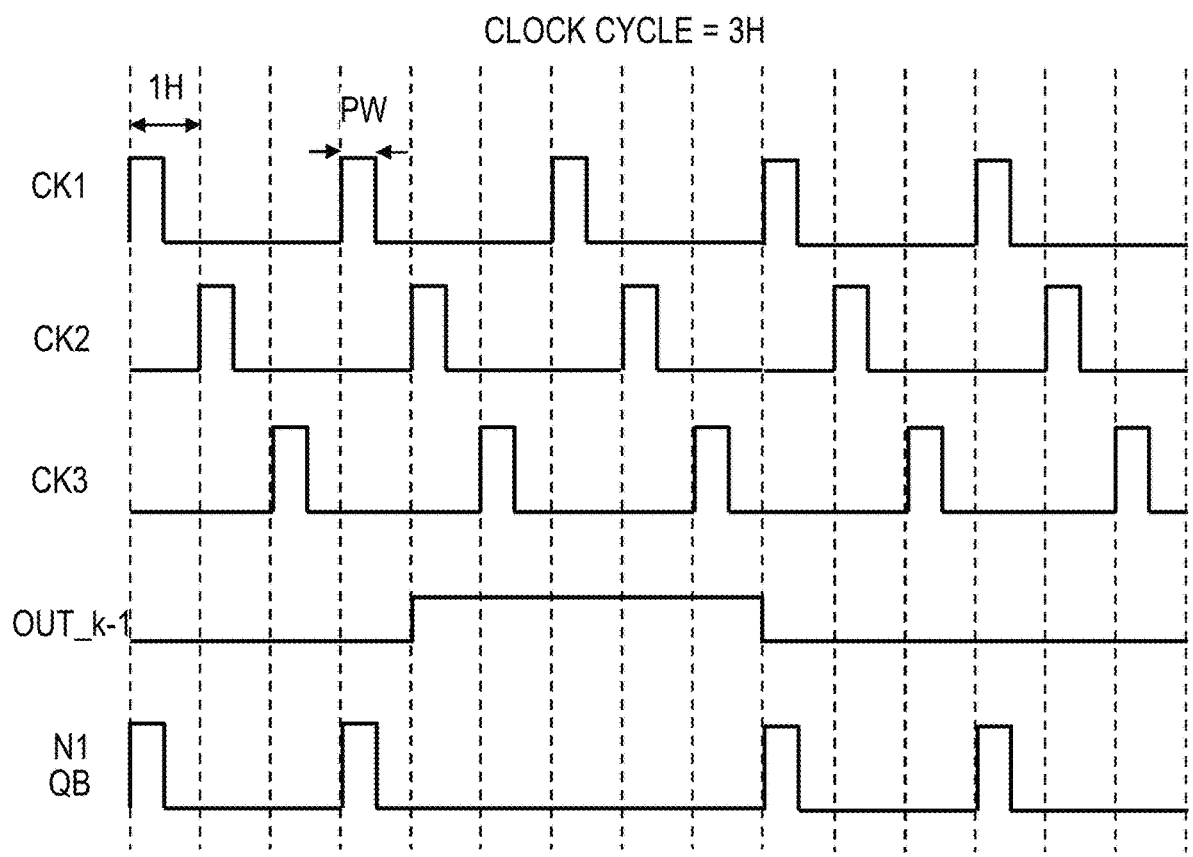
FIG. 14 illustrates temporal variation of the clock signals and some signals of a shift register in FIG. 13.

FIG. 14 illustrates temporal variation of the clock signals CK1, CK2, and CK3 and some signals (including node potentials) of the shift register 350_k−1. Specifically, FIG. 14 illustrates temporal variation of the clock signals CK1, CK2, and CK3, the output signal OUT_k−1, and the potentials at the nodes N1 and QB. The temporal variation of the potential at the node N1 is the same as the one at the node QB. Each interval between broken lines corresponds to 1H period. The clock signals CK1, CK2, and CK3 have the same pulse width (the length of one high-level period) PW and the same cycle.

The timing chart illustrating temporal variation of the clock signals CK1, CK2, and CK3 and the signals (including node potentials) of the shift register 350_k is obtained by rewriting CK1, CK2, and CK3 in the timing chart of FIG. 14 into CK2, CK3, and CK1, respectively. The timing chart illustrating temporal variation of the clock signals CK1, CK2, and CK3 and the signals (including node potentials) of the shift register 350_k+1 is obtained by rewriting CK1, CK2, and CK3 in the timing chart of FIG. 14 into CK3, CK1, and CK2, respectively.

That is to say, the uppermost clock signal in FIG. 14 is the clock signal input to the clock terminal CK and the next clock signal thereunder is the clock signal input to the clock terminal XCK. The lowermost clock signal is the clock signal not input to the shift register.

The scanning circuit of FIG. 13 is controlled by three clock signals (a three-phase clock) and each clock signal has a cycle of 3H. The cycle of each clock signal of the two-phase clock illustrated in FIG. 12 is 2H. The clock pulse width PW does not depend on the number of phases of the control clock but has a finite length of not more than 1H. In a period where the output OUT is at VGL, the pulse cycles at the nodes N1 and QB are the same as the cycle of the clock signals input to the shift register 350.

As described above, the number of phases of the clock for controlling the shift registers in the scanning circuit 133 to perform overlap scanning is two. However, the number of phases of the clock for controlling a scanning circuit including a plurality of shift registers can take any integer m greater than one. As understood from the description provided with reference to FIGS. 11 to 13, the clock cycle increases with increase in the number of phases m of the control clock for the scanning circuit.

More specifically, the clock cycle CKP=m×H, where H represents the length of one horizontal period. The pulse width PW of each clock signal is not more than 1H. Different clock signals have the same pulse width PW and the same clock cycle CKP but they are different in phase. The phase difference between two clock signals closest in phase is 1H.

The H-duty or the rate of the period where a clock signal is at a High level depends on the pulse width of the clock signal, the number of phases m of the clock for the scanning circuit, and one horizontal period H. Specifically, the following formula is established:

$$H\text{-duty}=PW/mH.$$

Increase in the number of phases m of the control clock for the scanning circuit elongates the clock cycle CKP=m×H. As described with reference to FIGS. 12 and 13, the potentials at the nodes N1 and QB are at an L-level in the period where the output OUT of the shift register is at an H-level. In the period where the output OUT of the shift register is at an L-level, these potentials vary in the same manner as the clock signal CK1. That is to say, the potentials at these nodes have the same pulse width, the same cycle, and the same phase. In other words, the H-duties of the nodes N1 and QB are the same as the one of the clock signal CK1 in this period. In one frame period, the H-duties of the nodes N1 and QB are not more than the H-duty of the clock signal CK1.

Among the signals (potentials) supplied to the gates of the transistors in the shift register, the potentials at the nodes N1 and QB have the highest H-duties in one frame period. The potential at the node N1 is supplied to the gates of the transistors M5 and M6 and the potential at the node QB is supplied to the gate of the transistor M9. Accordingly, the on-duties of the transistors M5, M6, and M9 are not more than PW/mH.

In an embodiment of this disclosure, the transistors M5, M6 and M9 in a scanning circuit to be controlled by a clock having two or more phases are configured to have on-duties not more than ½ (50%). As understood from the foregoing description, the other transistors have lower on-duties than these transistors. In other words, each transistor in the shift register has an on-duty of not more than PW/mH. This configuration effectively suppresses the deterioration of characteristics of each transistor and the deterioration of characteristics of the shift register including the transistors.

The on-duties of the transistors M5, M6, and M9 can be reduced by reducing the H-duties of the nodes N1 and QB. The H-duties of the nodes N1 and QB can be reduced by narrowing the pulse width of the clock signal CK1 or increasing the number of phases of the clock.

The inventors evaluated the effects of the pulse width of the control clock signal onto the outputs of scanning circuits including the shift registers illustrated in FIGS. 5 to 7. The control clock for the scanning circuits was a two-phase clock. As a result, the inventors found that the shift registers cannot generate an appropriate output waveform when the pulse width of the clock signal CK1 is too narrow.

Figure 15A:
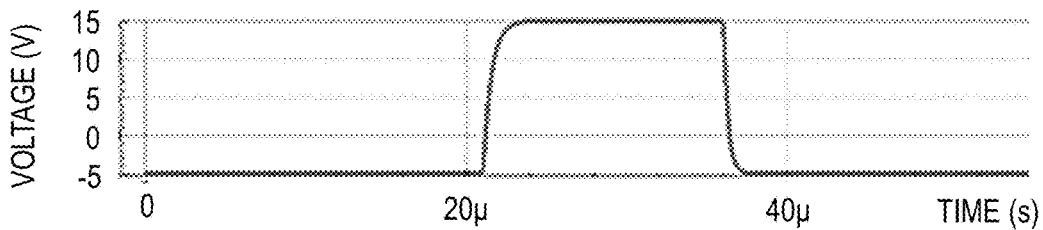
FIG. 15A provides a simulation result on the output waveform of a shift register when the clock signal has a pulse width of 3.00 μm.
Figure 15B:
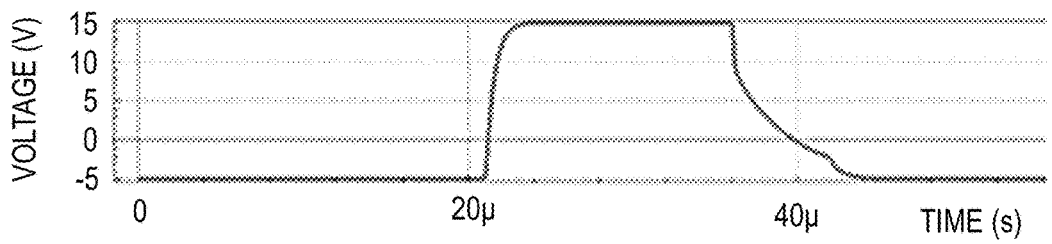
FIG. 15B provides a simulation result on the output waveform of a shift register when the clock signal has a pulse width of 1.62 μm.
Figure 15C:
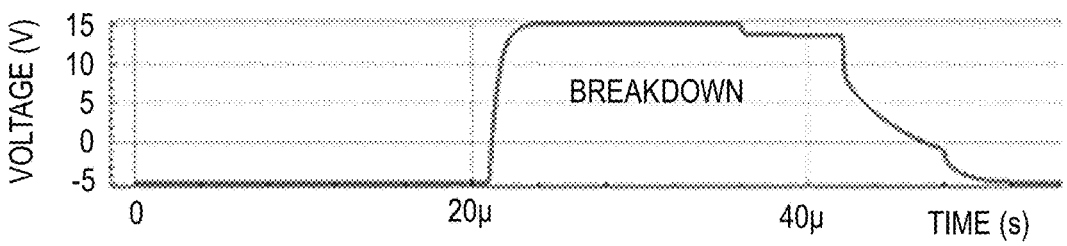
FIG. 15C provides a simulation result of the output waveform of a shift register when the clock signal has a pulse width of 0.36 μm.

FIGS. 15A to 15C provide results of a simulation on the output waveform of a shift register when the clock signal CK1 has different pulse widths. One horizontal (1H) period was 3 μs. The evaluation of the inventors revealed that appropriate output waveforms were obtained when the H-duty of the clock signal CK1 was 1.3% or more (the same applies to the clock signal CK2), as shown in FIGS. 15A to 15C.

Figure 16:
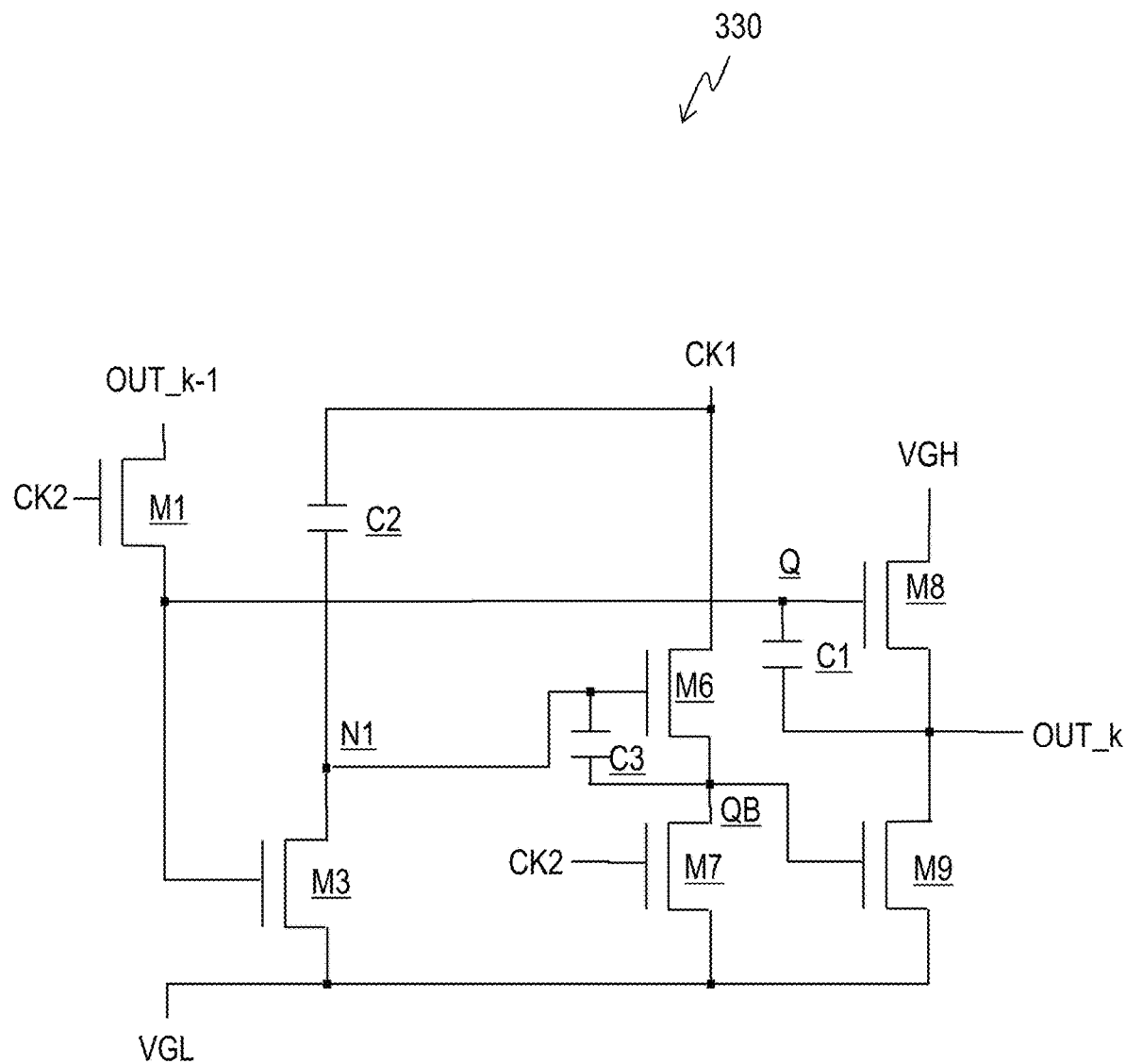
FIG. 16 illustrates still another configuration example of a shift register.

FIG. 16 illustrates still another configuration example 330 of a shift register. Compared to the configuration of the shift register 310 illustrated in FIG. 6, the shift register 330 does not include transistors M4 and M5 and the gate of the transistor M7 receives the second clock signal CK2. The other components are the same as those in the shift register 310. Controlling ON/OFF of the transistor M7 with the second clock signal CK2 allows the transistors M4 and M5 to be excluded. As a result, the circuit can be downsized with the smaller number of transistors while achieving low on-duties of the transistors.

Figure 17:
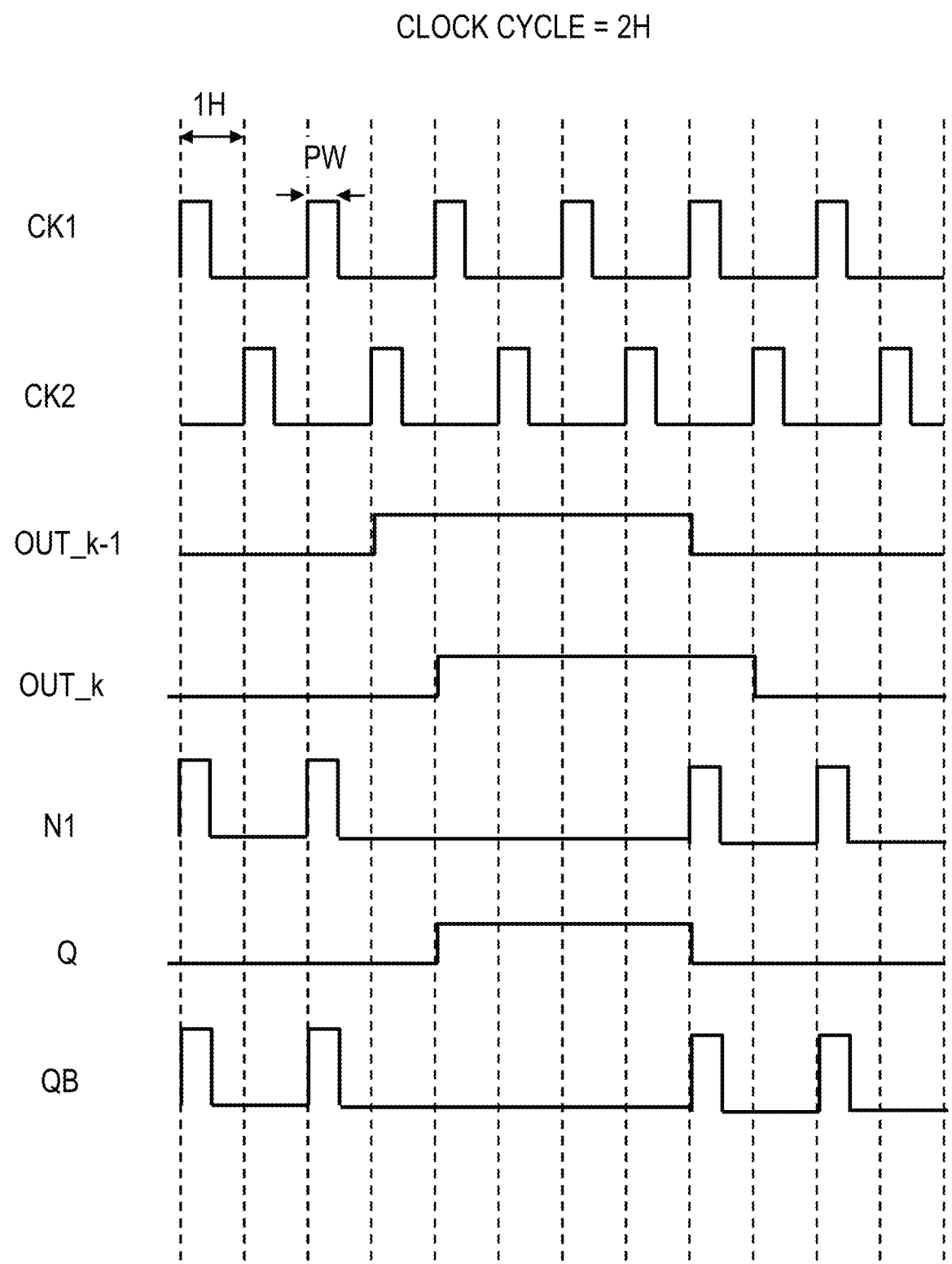
FIG. 17 illustrates temporal variation of some signals of the shift register in FIG. 16.

FIG. 17 illustrates temporal variation of some signals of the shift register in FIG. 16, specifically, temporal variation of the clock signals CK1 and CK2, the output signal OUT_k−1 of the previous stage, the output signal OUT_k of this stage, and the potentials at the nodes N1, Q, and QB. Each interval between broken lines corresponds to 1H period. The clock signals CK1 and CK2 have a pulse width PW. The temporal variation of each signal (potential) is the same as the corresponding one in FIG. 8.

Figure 18:
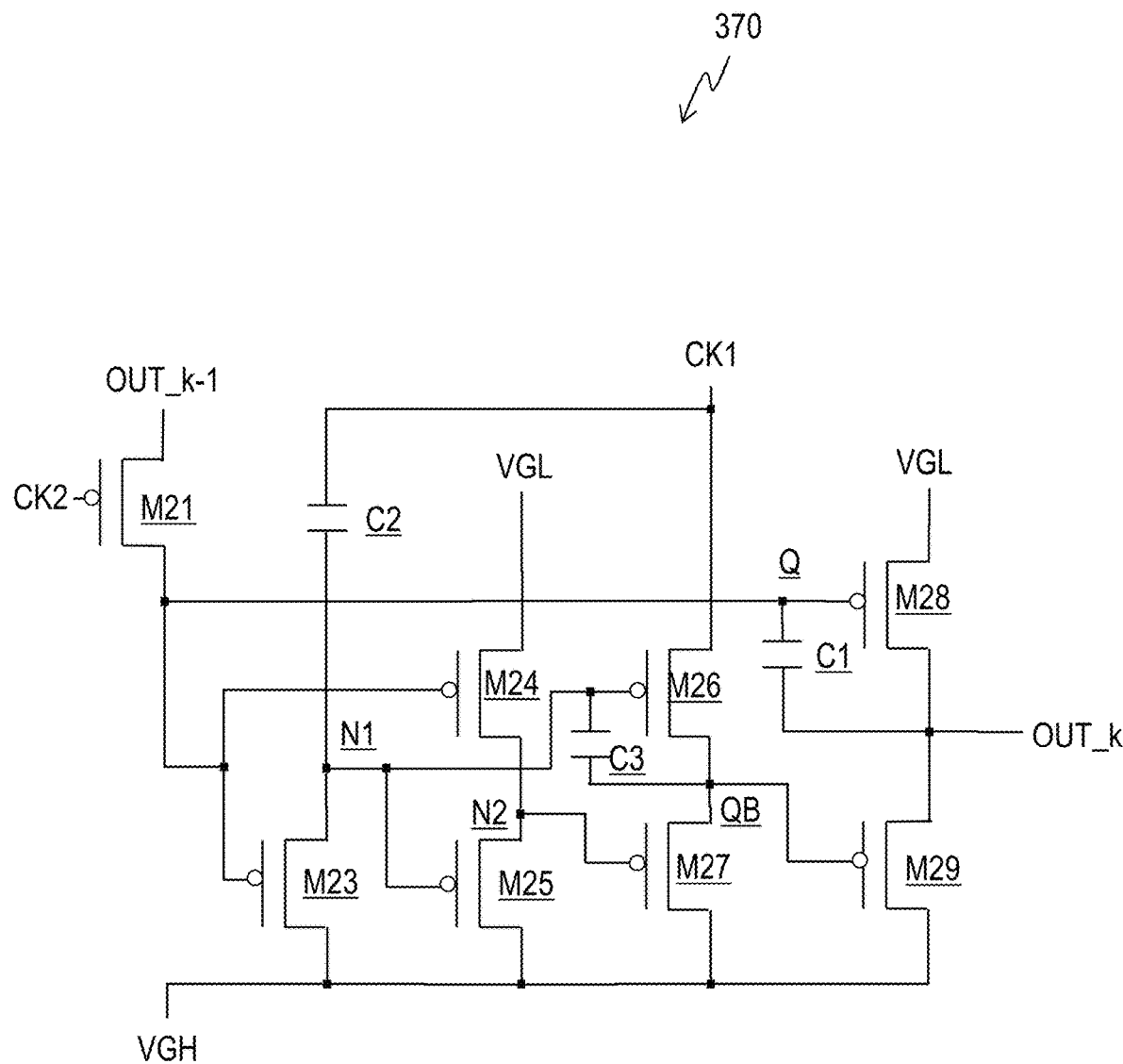
FIG. 18 illustrates still another configuration example of a shift register.

FIG. 18 illustrates still another configuration example 370 of a shift register. Compared to the configuration of the shift register 310 illustrated in FIG. 6, the n-type thin-film transistors M1 to M9 in the shift register 310 in FIG. 6 are replaced with p-type thin-film transistors M21 to M29 and further, inputs of the power supply potentials VGL and VGH are replaced with each other. Specifically, the power supply potential VGL is input to the drain of the transistor M28 and the power supply potential VGH is input to the sources of the transistors M23, M25, M27, and M29. In similar, the transistors in the shift registers illustrated in FIGS. 5, 7, and 16 can be replaced with p-type transistors.

FIG. 19 illustrates temporal variation of some signals of the shift register in FIG. 18, specifically, temporal variation of the clock signals CK1 and CK2, the output signal OUT_k−1 of the previous stage, the output signal OUT_k of this stage, and the potentials at the nodes N1, N2, Q, and QB. The temporal variation of each signal (potential) is opposite to the corresponding one in FIG. 8 with respect to the H-level and the L-level.

For example, the low-duties of the clock signals CK1 and CK2 are expressed 5 as PW/mH, PW represents pulse widths of the clock signals CK1 and CK2 and H represents one horizontal period. ON-duties of the thin-film transistors are not more than PW/mH. The low-duties may be not less than 1.3%.

As set forth above, embodiments of this disclosure have been described; however, this disclosure is not limited to the foregoing embodiments. Those skilled in the art can easily modify, add, or replace each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A scanning circuit configured to output gate signals to pixel circuits of a display panel, the scanning circuit comprising:
    a plurality of shift registers connected in series,
    wherein the scanning circuit is configured to be controlled by m phases of clock signals, where m is an integer greater than one,
    wherein the plurality of shift registers are configured to output high-level pulses each having a length of two or more horizontal periods one after another with a transfer step of one horizontal period,
    wherein each of the plurality of shift registers is configured to be controlled by two-phase clock signals consisting of a first clock signal and a second clock signal in the m phases of clock signals,
    wherein all thin-film transistors in each of the plurality of shift registers have the same conductive type,
    wherein each of the plurality of shift registers includes:
        a high-level output thin-film transistor including a source connected to an output terminal of the shift register and a drain connected to a high-power line;
        a low-level output thin-film transistor including a drain connected to the output terminal of the shift register and a source connected to a low-power line; and
        a buffer thin-film transistor including a source/drain terminal to receive the first clock signal and another source/drain terminal connected to a gate of the low-level output thin-film transistor,
    wherein the buffer thin-film transistor is configured to receive a control signal having a pulse width and a cycle same as the first clock signal at a gate of the buffer thin-film transistor in a period where the output terminal is outputting a low-level potential,
    wherein high-duties of the first clock signal and the second clock signal are expressed as PW/mH, where PW represents pulse widths of the first clock signal and the second clock signal and H represents one horizontal period, and
    wherein on-duties of all the thin-film transistors are not more than PW/mH.

2. The scanning circuit according to claim 1,
    wherein the buffer thin-film transistor is a first buffer thin-film transistor, and
    wherein the scanning circuit further comprises:
        a second buffer thin-film transistor including a source connected to the low-power line and a drain connected to a gate of the low-level output thin-film transistor;
        a first thin-film transistor including a source/drain to receive a signal from a previous shift register and another source/drain connected to a gate of the high-level output thin-film transistor, the first thin-film transistor being configured to be controlled by the second clock signal;
        a third thin-film transistor including a gate connected to the gate of the high-level output thin-film transistor and a source connected to the low-power line;
        a fourth thin-film transistor including a gate connected to the gate of the high-level output thin-film transistor, a drain connected to the high-power line, and a source connected to a gate of the second buffer thin-film transistor; and
        a fifth thin-film transistor including a gate connected to the gate of the first buffer thin-film transistor, a source connected to the low-power line, and a drain connected to the gate of the second buffer thin-film transistor.

3. The scanning circuit according to claim 1,
    wherein the buffer thin-film transistor is a first buffer thin-film transistor, and
    wherein the scanning circuit further comprises:
        a second buffer thin-film transistor including a source connected to the low-power line, a drain connected to a gate of the low-level output thin-film transistor, and a gate to receive the second clock signal;
        a first thin-film transistor including a source/drain to receive a signal from a previous shift register and another source/drain connected to a gate of the high-level output thin-film transistor, the first thin-film transistor being configured to be controlled by the second clock signal; and
        a third thin-film transistor including a gate connected to the gate of the high-level output thin-film transistor and a source connected to the low-power line.

4. The scanning circuit according to claim 2, wherein the gate of the first buffer thin-film transistor is further connected to a transmission line of the first clock signal via a capacitive element.

5. The scanning circuit according to claim 2, further comprising:
    a second thin-film transistor including a source connected to the low-power line and a drain connected to the gate of the high-level output thin-film transistor,
    wherein the second thin-film transistor is configured to be ON for a predetermined period in each frame period.

6. The scanning circuit according to claim 2, further comprising:
    a sixth thin-film transistor including a source connected to the low-power line and a drain connected to the output terminal,
    wherein the sixth thin-film transistor is configured to be ON for a predetermined period in each frame period.

7. The scanning circuit according to claim 5, further comprising:
    a sixth thin-film transistor including a source connected to the low-power line and a drain connected to the output terminal,
    wherein the sixth thin-film transistor is configured to be ON for a predetermined period in each frame period.

8. The scanning circuit according to claim 7, wherein the gate of the first buffer thin-film transistor is further connected to a transmission line of the first clock signal via a capacitive element.

9. The scanning circuit according to claim 1, wherein m is not less than 3.

10. The scanning circuit according to claim 1, wherein the high-duties are not less than 1.3%.

11. A scanning circuit configured to output gate signals to pixel circuits of a display panel, the scanning circuit comprising:
   a plurality of shift registers connected in series,
   wherein the scanning circuit is configured to be controlled by m phases of clock signals, where m is an integer greater than one,
   wherein the plurality of shift registers are configured to output low-level pulses each having a length of two or more horizontal periods one after another with a transfer step of one horizontal period,
   wherein each of the plurality of shift registers is configured to be controlled by two-phase clock signals consisting of a first clock signal and a second clock signal in the m phases of clock signals,
   wherein all thin-film transistors in each of the plurality of shift registers have the same conductive type,
   wherein each of the plurality of shift registers includes:
      a high-level output thin-film transistor including a drain connected to an output terminal of the shift register and a source connected to a high-power line;
      a low-level output thin-film transistor including a source connected to the output terminal of the shift register and a drain connected to a low-power line; and
      a buffer thin-film transistor including a source/drain terminal to receive the first clock signal and another source/drain terminal connected to a gate of the low-level output thin-film transistor,
   wherein the buffer thin-film transistor is configured to receive a control signal having a pulse width and a cycle same as the first clock signal at a gate of the buffer thin-film transistor in a period where the output terminal is outputting a low-level potential,
   wherein low-duties of the first clock signal and the second clock signal are expressed as PW/mH, where PW represents pulse widths of the first clock signal and the second clock signal and H represents one horizontal period, and
   wherein on-duties of all the thin-film transistors are not more than PW/mH.

12. The scanning circuit according to claim 11,
   wherein the buffer thin-film transistor is a first buffer thin-film transistor, and
   wherein the scanning circuit further comprises:
      a second buffer thin-film transistor including a drain connected to the low-power line and a source connected to a gate of the low-level output thin-film transistor;
      a first thin-film transistor including a source/drain to receive a signal from a previous shift register and another source/drain connected to a gate of the high-level output thin-film transistor, the first thin-film transistor being configured to be controlled by the second clock signal;
      a third thin-film transistor including a gate connected to the gate of the high-level output thin-film transistor and a drain connected to the low-power line;
      a fourth thin-film transistor including a gate connected to the gate of the high-level output thin-film transistor, a source connected to the high-power line, and a drain connected to a gate of the second buffer thin-film transistor; and
      a fifth thin-film transistor including a gate connected to a gate of the first buffer thin-film transistor, a drain connected to the low-power line, and a source connected to the gate of the second buffer thin-film transistor.

13. The scanning circuit according to claim 11,
   wherein the buffer thin-film transistor is a first buffer thin-film transistor, and
   wherein the scanning circuit further comprises:
      a second buffer thin-film transistor including a drain connected to the low-power line, a source connected to a gate of the low-level output thin-film transistor, and a gate to receive the second clock signal;
      a first thin-film transistor including a source/drain to receive a signal from a previous shift register and another source/drain connected to a gate of the high-level output thin-film transistor, the first thin-film transistor being configured to be controlled by the second clock signal; and
      a third thin-film transistor including a gate connected to the gate of the high-level output thin-film transistor and a drain connected to the low-power line.

14. The scanning circuit according to claim 11, wherein m is not less than 3.

15. The scanning circuit according to claim 11, wherein the low-duties are not less than 1.3%.

16. The scanning circuit according to claim 3, wherein the gate of the first buffer thin-film transistor is further connected to a transmission line of the first clock signal via a capacitive element.

17. The scanning circuit according to claim 3, further comprising:
   a second thin-film transistor including a source connected to the low-power line and a drain connected to the gate of the high-level output thin-film transistor,
   wherein the second thin-film transistor is configured to be ON for a predetermined period in each frame period.

18. The scanning circuit according to claim 3, further comprising:
   a sixth thin-film transistor including a source connected to the low-power line and a drain connected to the output terminal,
   wherein the sixth thin-film transistor is configured to be ON for a predetermined period in each frame period.

19. The scanning circuit according to claim 17, further comprising:
   a sixth thin-film transistor including a source connected to the low-power line and a drain connected to the output terminal,
   wherein the sixth thin-film transistor is configured to be ON for a predetermined period in each frame period.

* * * * *